(12) United States Patent
Fujimoto

(10) Patent No.: US 12,035,647 B2
(45) Date of Patent: Jul. 16, 2024

(54) AUTOMATIC TRAVEL SYSTEM FOR WORK VEHICLES

(71) Applicant: Yanmar Power Technology Co., Ltd., Osaka (JP)

(72) Inventor: Shogo Fujimoto, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 658 days.

(21) Appl. No.: 17/271,543

(22) PCT Filed: Jul. 9, 2019

(86) PCT No.: PCT/JP2019/027206
§ 371 (c)(1),
(2) Date: Feb. 25, 2021

(87) PCT Pub. No.: WO2020/044799
PCT Pub. Date: Mar. 5, 2020

(65) Prior Publication Data
US 2021/0337715 A1    Nov. 4, 2021

(30) Foreign Application Priority Data
Aug. 28, 2018  (JP) ................................ 2018-159777

(51) Int. Cl.
*A01B 63/111*   (2006.01)
*G05D 1/00*     (2006.01)

(52) U.S. Cl.
CPC .......... *A01B 63/111* (2013.01); *G05D 1/0011* (2013.01)

(58) Field of Classification Search
None
See application file for complete search history.

(56) References Cited

U.S. PATENT DOCUMENTS

2017/0090196 A1* 3/2017 Hendron ............... G06T 19/006
2018/0164797 A1* 6/2018 Meiners ............... G05D 1/0011

* cited by examiner

Primary Examiner — Tamara L Weber
(74) Attorney, Agent, or Firm — Chris Mizumoto

(57) ABSTRACT

An automatic travel system for a work vehicle allows the work height of a work device to be easily and appropriately adjusted by a remote operation that uses a remote operation device for a work vehicle during automatic travel. The automatic travel system for work vehicles includes an automatic travel unit, and a remote operation device, for a work vehicle. A work vehicle has a work height setting unit, a height detector, a raising and lowering indicator, and a raising and lowering control unit, for a work device. The raising and lowering control unit sets a control target height to a work height on the basis of the indication of the raising and lowering indicator and executes automatic raising and lowering control so that the height position of a work device (6) matches the work height. The remote operation device has a display device that displays remote operation information, and a work height adjustor that allows adjustment of the work height while in automatic travel mode. The display device has a work height display section that displays the work height of the work device, the work height after adjustment, and the height position of the work device.

4 Claims, 10 Drawing Sheets

AUTOMATIC TRAVEL SYSTEM FOR WORK VEHICLES

CROSS-REFERENCE

This application is a US National Stage Application under 35 U.S.C. § 371 of International Application No. PCT/W2019/027206 filed Jul. 9, 2019, which claims foreign priority of JP2018-159777 filed Aug. 28, 2018 the disclosures of which are hereby incorporated by reference in their entirety.

TECHNICAL FIELD

The present invention relates to an automatic travel system for work vehicles, including an automatic travel unit that enables automatic traveling of a work vehicle and a remote operation device that enables a remote operation on the work vehicle via wireless communication.

BACKGROUND ART

As an automatic travel system for work vehicles, as described above, there is one that is configured such that a work vehicle, of which a work device (work machine) is connected to the rear part of a tractor so as to be capable of being raised and lowered, includes a raising and lowering switch that enables raising and lowering operation of the work device, and, further, a remote operation device (wireless communication terminal) includes a display that displays a work machine height display section for numerically displaying the current height of the work device and a work machine height adjustment unit for finely adjusting the height of the work machine, so that it is possible for the user to perform a height adjustment operation of the work device directed to the work vehicle that is automatically traveling by operating the work machine height adjustment unit that is displayed on the display of the remote operation device without a burden of once stopping the work vehicle that is automatically traveling and operating the raising and lowering switch included in the work vehicle (for example, see Patent Literature 1).

CITATION LIST

Patent Literature

Patent Literature 1: Japanese Unexamined Patent Application Publication No. 2017-167995

DISCLOSURE OF INVENTION

Problems to be Solved by the Invention

In the configuration described in Patent Literature 1, since the work machine height display section of the display only displays the current height of the work device in a case where the user finely adjusts the height of the work device by operating the work machine height adjustment unit of the remote operation device while the work vehicle is automatically traveling, the user is not able to figure out the height of the work device according to the operation on the work machine height adjustment unit during the time from when the user operates the work machine height adjustment unit to the time when the current height of the work device is changed based on the operation, and, further, the user would not be able to figure out the height adjustment amount of the work device based on an operation on the work machine height adjustment unit unless the user remembers the current height of the work device, which is displayed on the work machine height display section, before operating the work machine height adjustment unit. Therefore, it has been difficult to properly adjust the height of the work device by operating the work machine height adjustment unit.

In view of this situation, the main object of the present invention is to make it possible to easily and properly adjust the work height of the work device by a remote operation directed to the work vehicle that is automatically traveling by use of a remote operation device.

Means for Solving the Problems

The first characteristic configuration of the present invention is that an automatic travel system for work vehicles includes an automatic travel unit for enabling automatic traveling of a work vehicle and a remote operation device for enabling a remote operation on the work vehicle via wireless communication, that the work vehicle includes a work device that can be raised and lowered, a work height setting unit for setting a work height of the work device, a height detector for detecting a height position of the work device, a raising and lowering instruction unit for providing an instruction for raising and lowering of the work device, and a raising and lowering control unit for controlling raising and lowering of the work device, that the raising and lowering control unit executes automatic raising and lowering control for setting a control target height of the work device as the work height, based on the instruction from the raising and lowering instruction unit, and matching the height position of the work device with the work height, that the remote operation device includes a display device for displaying information related to the remote operation of the work vehicle and a work height adjustor for enabling manual adjustment of the work height in an automatic traveling mode of the work vehicle, and that the display device includes a work height display section for displaying the work height that is set with the work height setting unit, the work height that has been adjusted by the work height adjustor, and the height position of the work device that is detected by the height detector.

According to the present configuration, in a case where the user manually adjusts the work height of the work device by use of the work height adjustor of the remote operation device when the work vehicle is automatically traveling, the work height of the work device that is set with the work height setting unit of the work vehicle (hereinafter referred to as the set work height), the set work height that has been adjusted by manual adjustment with the work height adjustor of the remote operation device (adjusted work height), and the height position of the work device that is detected by the height detector are displayed in the work height display section of the display device provided in the remote operation device.

Accordingly, it is possible for the user to easily figure out each of the set work height, the adjusted set work height, and the height position of the work device by visually checking the work height display section of the display device. Then, when manually adjusting the set work height by operating the work height adjustor, it is possible to easily figure out the adjustment amount in the set work height adjusted by the work height adjustor, the change amount in the height position of the work device according to the adjustment amount, etc., by comparing the set work height, the adjusted set work height, and the height position of the work device, which are displayed in the work height display section.

As a result, it is possible to easily and properly adjust the work height of the work device by performing a remote operation directed to the work vehicle that is automatically traveling by use of the remote operation device.

The second characteristic configuration of the present invention is that, along with termination of the automatic traveling mode, the raising and lowering control unit disables the manual adjustment of the work height with the work height adjustor and prohibits execution of the automatic raising and lowering control.

According to the present configuration, it is possible to avoid the set work height acquired according to an operation on the work height setting unit from differing between before and after the set work height is adjusted with the work height adjustor, which is caused if the manual adjustment of the set work height with the work height adjustor is enabled even after the termination of the automatic traveling mode.

Then, even in a case where the set work height is returned to the work height corresponding to the operation on the work height setting unit before being adjusted with the work height adjustor since the manual adjustment of the set work height with the work height adjustor is disabled along with the termination of the automatic traveling mode, it is possible to avoid a possibility that the work device is unexpectedly raised or lowered from the height position corresponding to the set work height adjusted with the work height adjustor to the height position corresponding to the unadjusted set work height, which is caused if the automatic raising and lowering control is executed after the termination of the automatic traveling mode, since execution of the automatic raising and lowering control is prohibited after the termination of the automatic traveling mode.

The third characteristic configuration of the present invention is that the work vehicle includes multiple raising and lowering operation tools related to raising and lowering of the work device, the multiple raising and lowering operation tools including the work height setting unit and the raising and lowering instruction unit, and that the raising and lowering control unit cancels the prohibition on execution of the automatic raising and lowering control when any of the raising and lowering operation tools is operated during the time of the prohibition on execution of the automatic raising and lowering control.

According to the present configuration, since the prohibition on execution of the automatic raising and lowering control, of which execution is prohibited along with the termination of the automatic traveling mode, is cancelled when the user boards the work vehicle of which the automatic traveling mode has been terminated and operates any of the raising and lowering operation tools provided in the work vehicle, the raising and lowering operation of the work device by an operation on the raising and lowering instruction unit becomes possible when the user makes the work vehicle travel in the manual traveling mode, so that the work device can be positioned at the set work height that is set with the work height setting unit, etc.

Further, when the user operates any of the raising and lowering operation tools, since the user expects raising or lowering of the work device based on the operation, even in a case where the prohibition on execution of the automatic raising and lowering control is cancelled because of the operation on any of the raising and lowering operation tools and then the work device is raised or lowered from the height position corresponding to the set work height adjusted with the work height adjustor to the height position corresponding to the unadjusted set work height, it is possible to avoid the raising or lowering of the work device at this moment from being an unexpectable situation for the user.

As a result, while avoiding the possibility that the work device is unexpectedly raised or lowered by the automatic raising and lowering control after the automatic traveling mode is terminated, the work device can be raised or lowered to the set work height that is set with the work height setting unit, etc., by the automatic raising and lowering control based on the operation on the raising and lowering instruction unit, etc., when the user makes the work vehicle travel in the manual traveling mode.

The fourth characteristic configuration of the present invention is that the remote operation device includes a communication state judgement unit for judging a communication state with the work vehicle and an adjustment disabling unit for disabling the manual adjustment of the work height with the work height adjustor after a judgement made by the communication state judgement unit in a case where the judgement indicates that an abnormality has been occurring to the communication state.

According to the present configuration, since the manual adjustment of the set work height with the work height adjustor is not disabled by the adjustment disabling unit unless an abnormality is not occurring to the communication state between the remote operation device and the work vehicle when the user operates the work height adjustor of the remote operation device to adjust the set work height for the work vehicle that is automatically traveling, adjustment of the set work height in response to an operation on the work height adjustor by the user can be performed with preferable responsiveness. Accordingly, when the work vehicle is automatically traveling in a state where the work device is positioned at the set work height, the work device can be raised or lowered to the height position according to the adjusted set work height with preferable responsiveness by the automatic raising and lowering control based on the set work height adjusted with the work height adjustor.

On the other hand, since the manual adjustment of the set work height with the work height adjustor is disabled by the adjustment disabling unit if an abnormality has been occurring to the communication state between the remote operation device and the work vehicle when the user operates the work height adjustor of the remote operation device to adjust the set work height for the work vehicle that is automatically traveling, it is possible to avoid a possibility that the adjusted set work height, which is greatly different from the unadjusted set work height, is sent from the remote operation device to the work vehicle when the abnormality of the communication state is resolved so that the height position of the work device is drastically changed because of the automatic raising and lowering control based on the adjusted set work height that is greatly different, which is cause if the manual adjustment of the set work height with the work height adjustor is enabled even during the time where the abnormality has been occurring to the communication state.

As a result, while making it possible to adjust the work height of the work device with preferable responsiveness by performing a remote operation directed to the work vehicle that is automatically traveling by use of the remote operation device when an abnormality is not occurring to the communication state between the remote operation device and the work vehicle, it is possible to avoid a possibility that inconvenience such as a malfunction of the work device occurs, which is caused if the height position of the work device is drastically changed when an abnormality occurs to

DESCRIPTION OF EMBODIMENTS

Hereinafter, as an example of a mode for carrying out the present invention, an explanation will be given of the embodiment in which the automatic travel system for a work vehicle, according to the present invention is applied to a tractor, which is an example of a work vehicle, based on the drawings. Note that the automatic travel system for a work vehicle, according to the present invention can be applied to a work vehicle other than a tractor, such as a riding-type mower, a riding-type rice transplanter, a combine, a wheel loader, or a snowplow.

Figure 1:
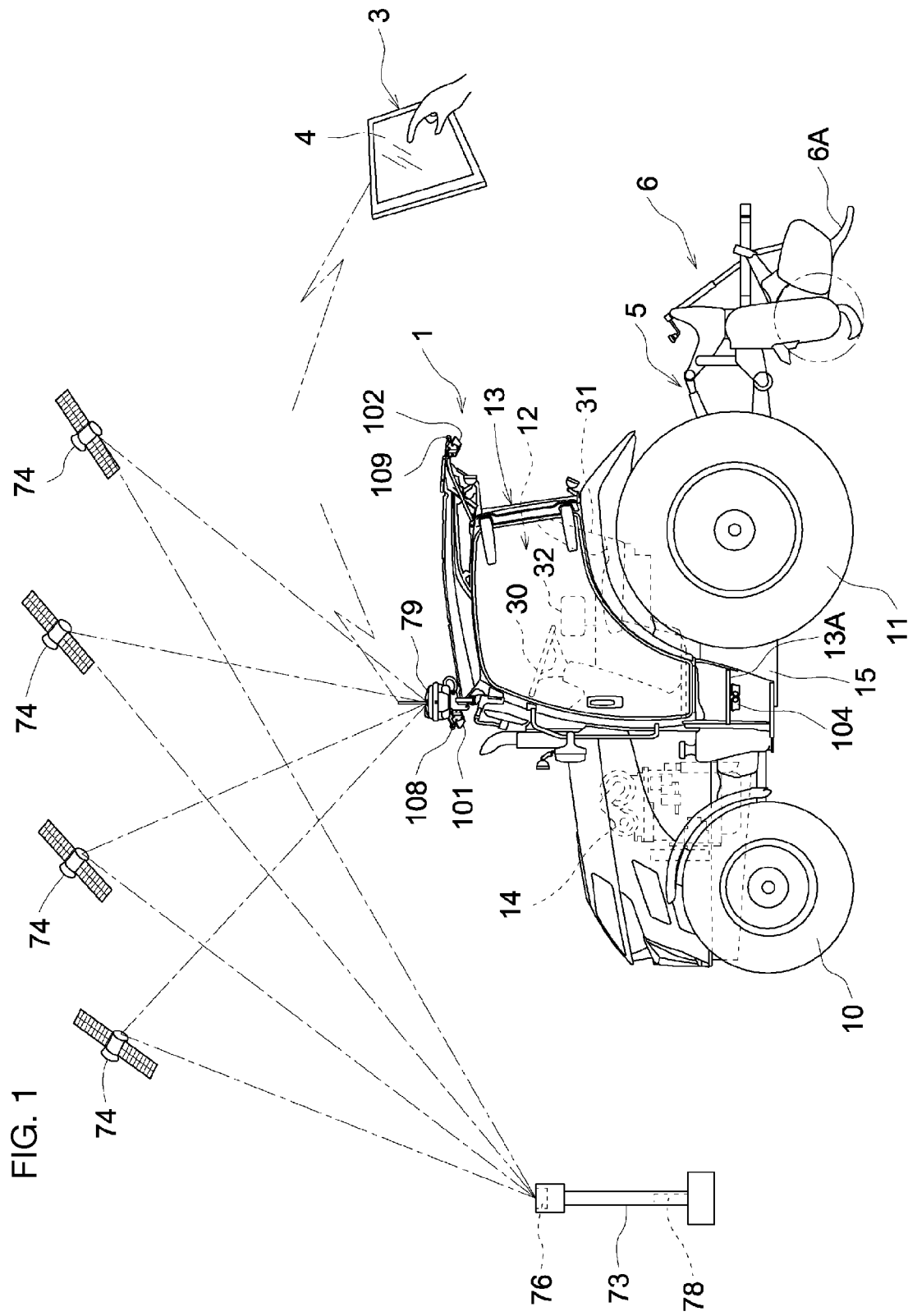
FIG. 1 is a diagram illustrating a schematic configuration of an automatic travel system for a work vehicle.
Figure 2:
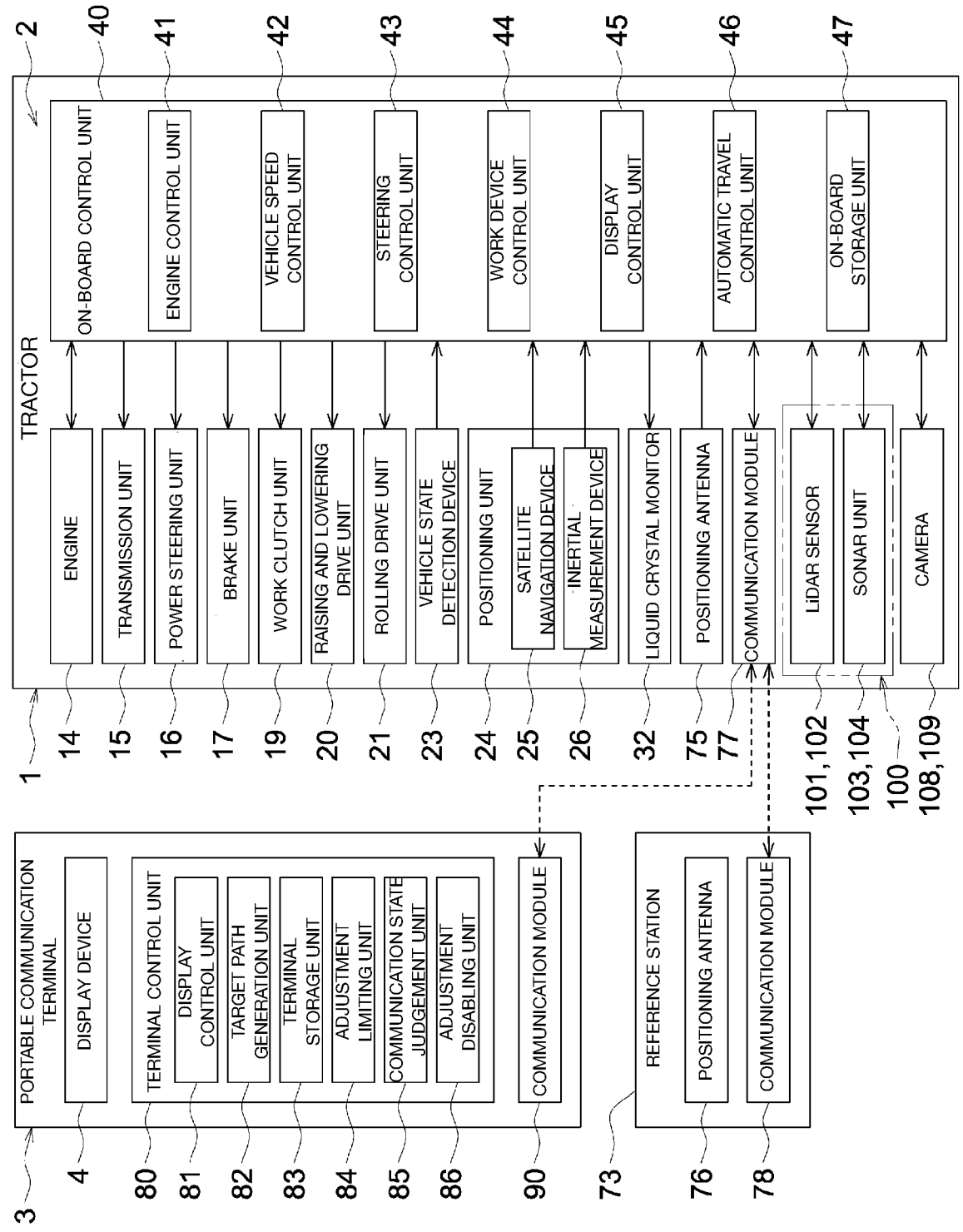
FIG. 2 is a block diagram illustrating a schematic configuration of the automatic travel system for a work vehicle.
Figure 3:
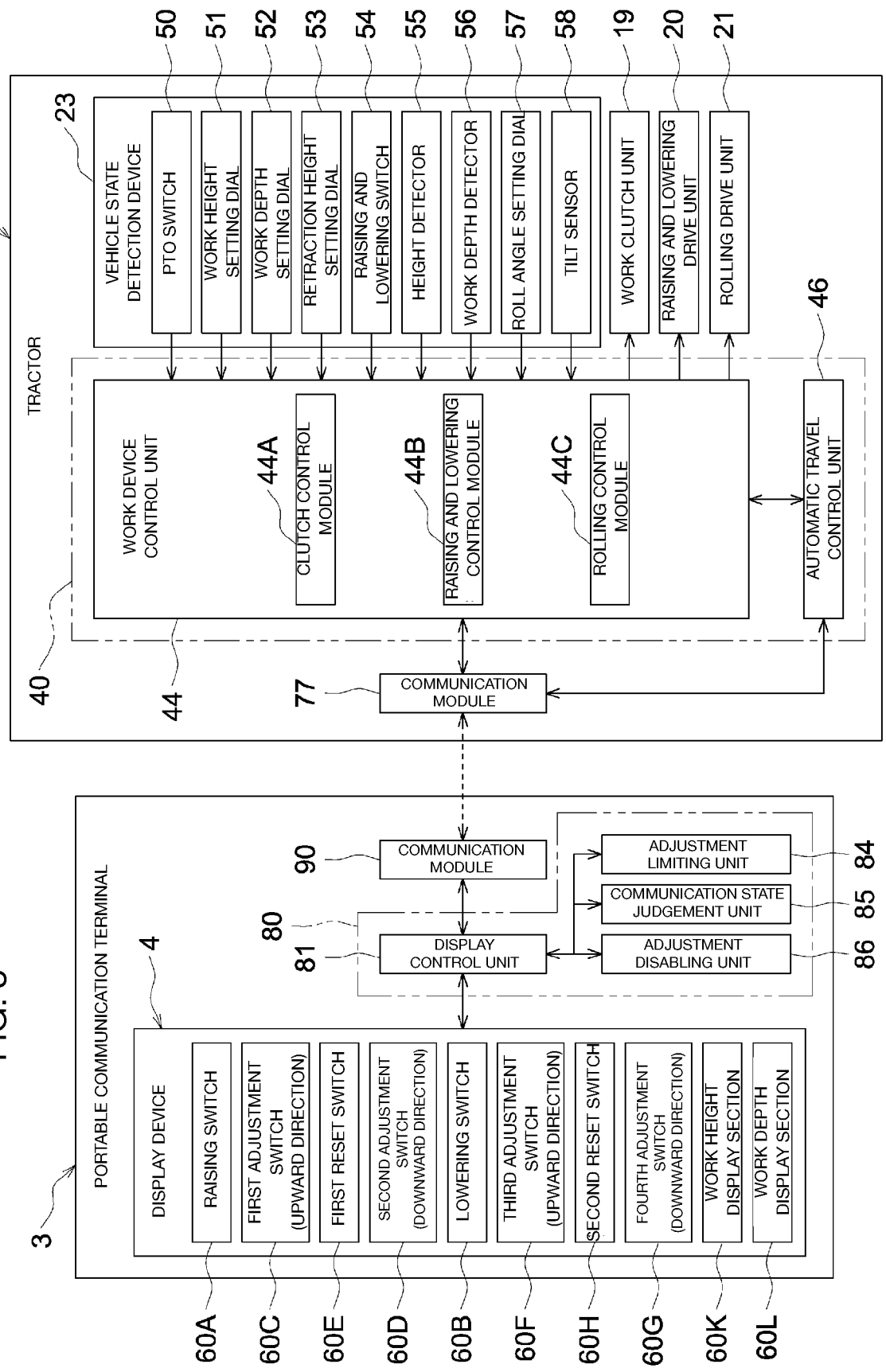
FIG. 3 is a block diagram illustrating a schematic configuration related to a remote operation on a work vehicle.

As illustrated in FIG. 1 through FIG. 3, the automatic travel system for a work vehicle, exemplified in this embodiment, includes an automatic travel unit 2, which enables automatic traveling of the tractor 1, a portable communication terminal 3, which is provided with a communication setting for enabling wireless communication with the automatic travel unit 2, etc. The portable communication terminal 3 functions as a remote operation device that enables a remote operation on the tractor 1 via wireless communication according to the above-described communication setting. As the portable communication terminal 3, it is possible to adopt a smartphone, a tablet-type personal computer, or the like, which includes a multi-touch-type display device (for example, a liquid crystal panel) 4 that enables an input operation, displaying of various kinds of information related to the automatic traveling and remote operation, etc.

Figure 4:
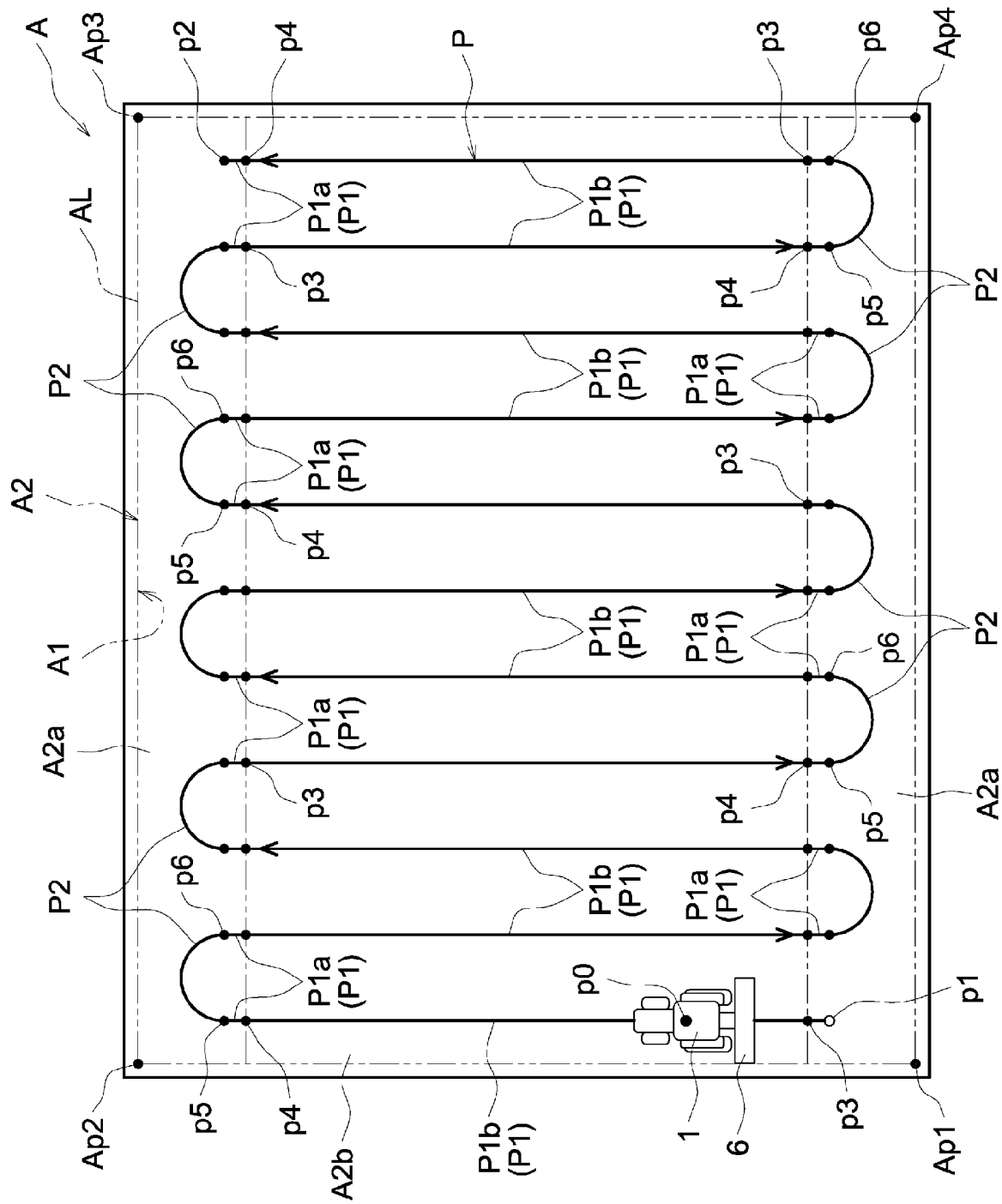
FIG. 4 is a diagram illustrating an example of a target path generated by a target path generation unit.
Figure 5:
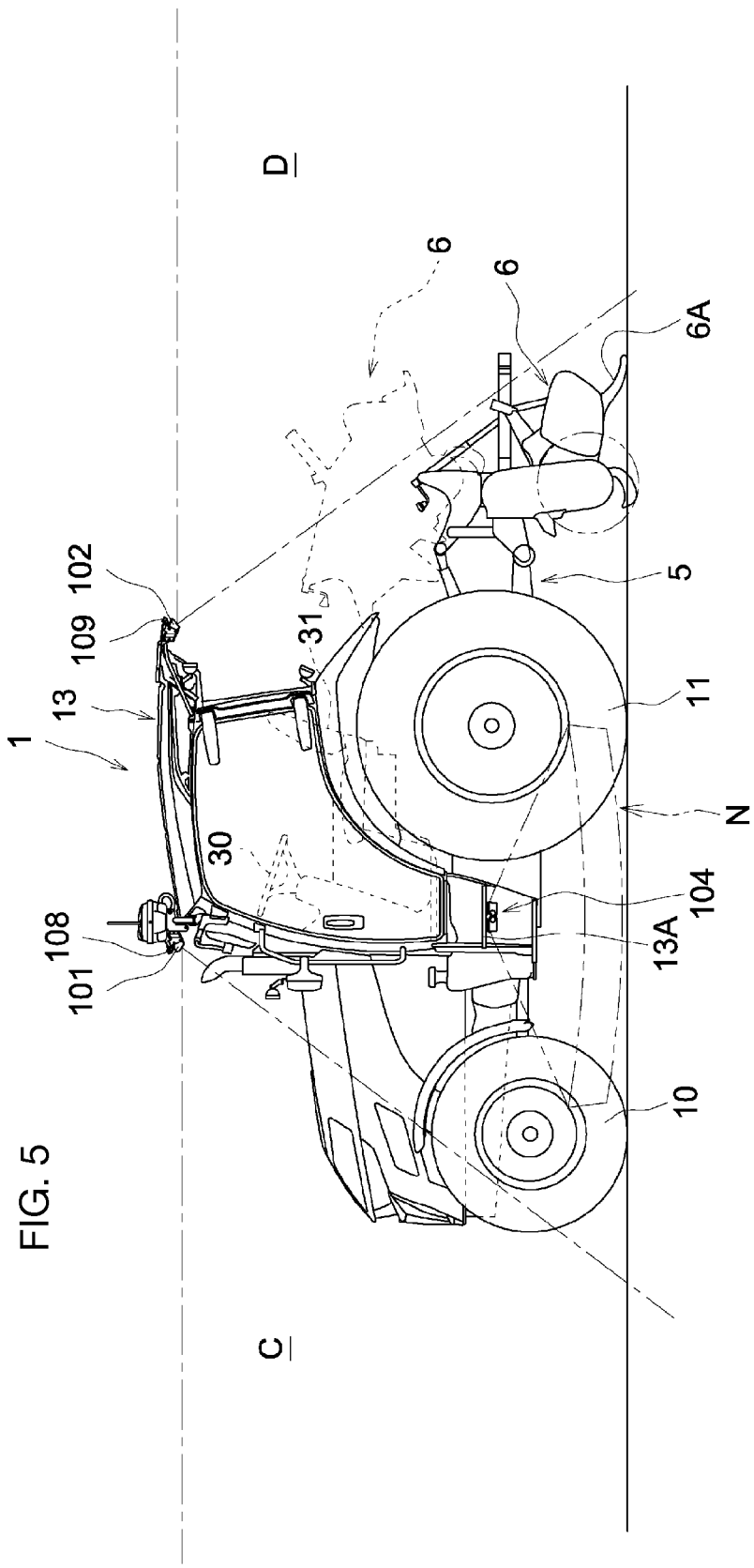
FIG. 5 is a diagram illustrating the measurement ranges of respective LiDAR sensors, etc., in a side view.
Figure 6:
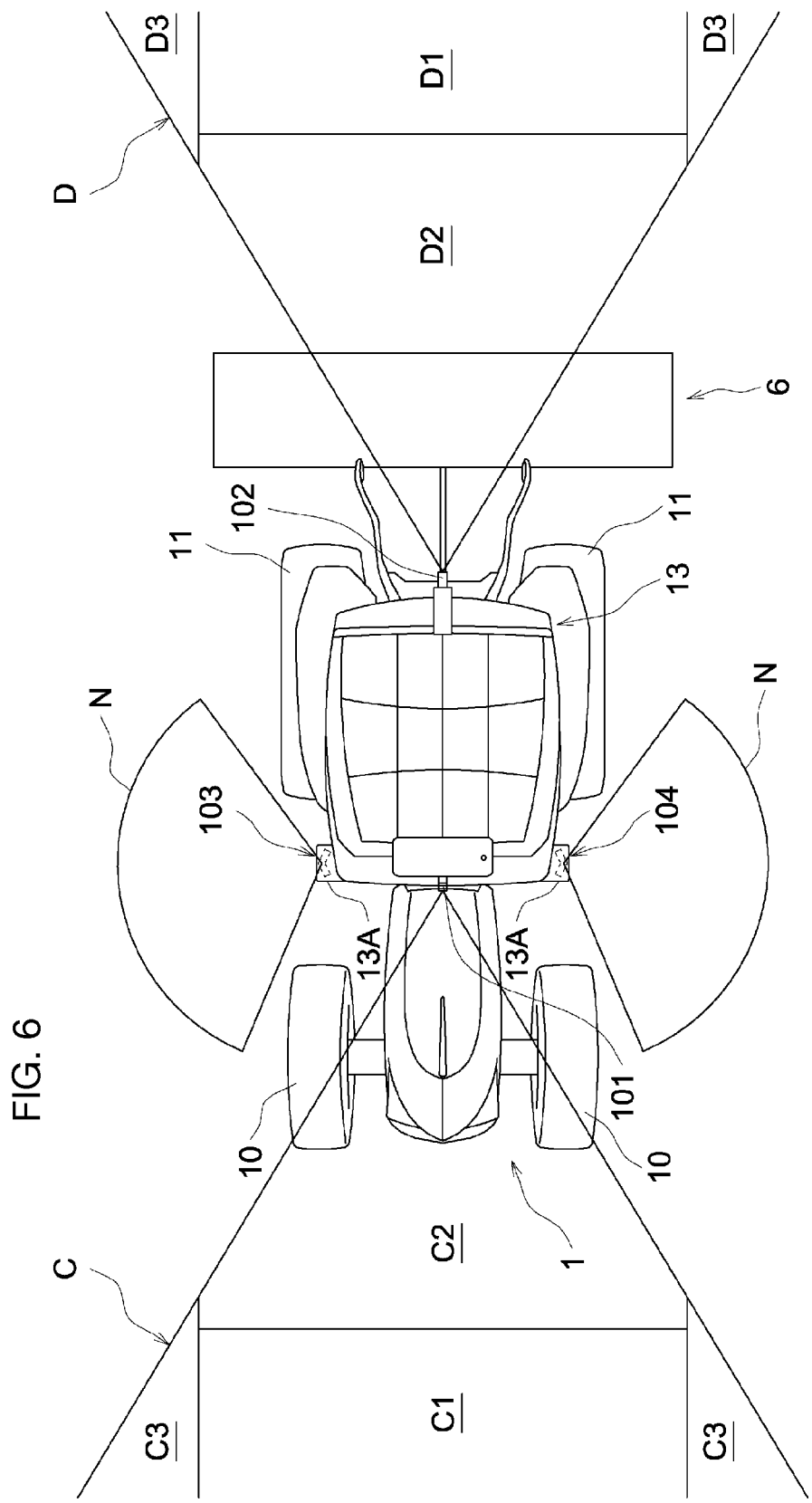
FIG. 6 is a diagram illustrating the measurement ranges of the respective LiDAR sensors, etc., in a plan view.

As illustrated in FIG. 4, the tractor 1 is configured to be capable of automatically traveling in a field A, etc., which is an example of a work site, by use of the automatic travel system for a work vehicle. As illustrated in FIG. 1 and FIG. 5 through FIG. 6, a rotary tillage device 6, which is an example of a work device, is connected to the rear part of the tractor 1 via a three-point link mechanism 5, so that the rotary tillage device 6 can be raised/lowered and rolled.

Accordingly, this tractor 1 is configured as a rotary tillage model that performs a tillage work with the rotary tillage device 6. Note that, instead of the rotary tillage device 6, it is possible that a variety of work devices such as a plow, a disc harrow, a cultivator, a subsoiler, a seeding device, a spraying device, or a mowing device is connected to the rear part of the tractor 1. In this way, the models of this tractor 1 can be changed to a plow model that performs a tillage work with a plow, a seeding model that performs a seeding work with a seeding device, etc.

As illustrated in FIG. 1 through FIG. 3 and FIG. 5 through FIG. 6, the tractor 1 includes drivable and steerable left and right front wheels 10, drivable left and right rear wheels 11, a cabin 13 that is forming a boarding-type driving section 12, an electronically-controlled diesel engine (hereinafter referred to as the engine) 14 including a common rail system, a transmission unit 15 for performing transmission for the power from the engine 14, a full-hydraulic power steering unit 16 for steering the left and right front wheels 10, a brake unit 17 for braking the left and right rear wheels 11, an electro-hydraulically-controlled work clutch unit 19 for controlling engagement/disengagement for the power transmission to the rotary tillage device 6, an electro-hydraulically-controlled raising and lowering drive unit 20 for driving the rotary tillage device 6 to be raised/lowered, an electro-hydraulically-controlled rolling drive unit 21 for driving the rotary tillage device 6 in the roll direction, a vehicle state detection device 23 including various kinds of sensors for detecting various kinds of setting states of the tractor 1 and operation states of each unit or the like and a switch, etc., a positioning unit 24 for measuring the current position, the current direction, etc., of the tractor 1, an on-board control unit 40 including various kinds of control units, etc. Note that, for the engine 14, it is also possible to adopt an electronically-controlled gasoline engine including an electronic governor, etc. It is also possible that the power steering unit 16 is an electric type provided with an electric motor.

Figure 7:
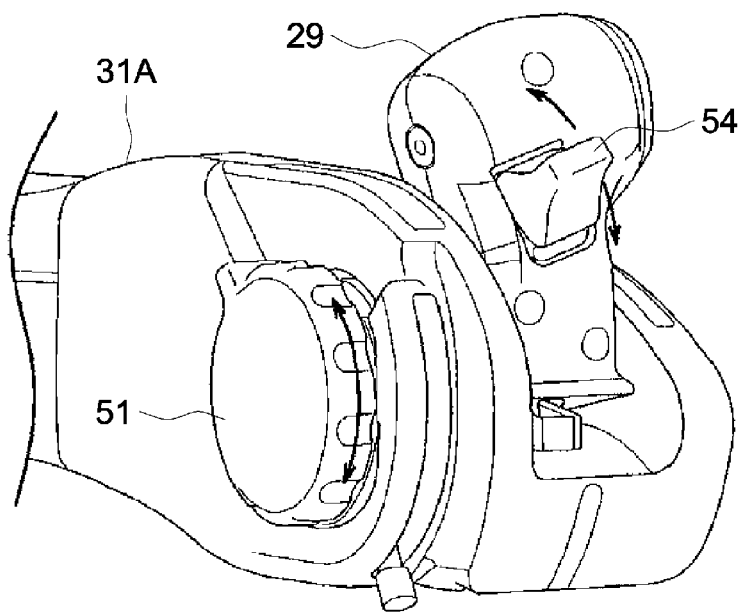
FIG. 7 is a perspective view of an armrest illustrating the arrangement of a work height setting dial, a raising and lowering switch, etc.

The driving section 12 includes a steering wheel 30 for manual steering, a seat 31 for a passenger, and a multi-touch-type liquid crystal monitor 32 that enables an input operation, displaying of various kinds of information, etc., as illustrated in FIG. 1 through FIG. 2 and FIG. 5, in addition to operation levers such as an acceleration lever and the main transmission lever 29 illustrated in FIG. 7, operation pedals such as an acceleration pedal and a clutch pedal, etc.

Although not illustrated in the drawings, the transmission unit 15 includes an electronically-controlled continuously-variable transmission device that performs transmission for the power from the engine 14, an electro-hydraulically-controlled forward-reverse switching device that switches the power, for which transmission has been performed by a continuously-variable transmission device, between the power for forward traveling and the power for reverse traveling, etc. As the continuously-variable transmission, an I-HMT (Integrated Hydro-static Mechanical Transmission), which is an example of a hydro-mechanical continuously-variable transmission whose power transmission efficiency is higher than a hydro-static continuously-variable transmission (HST: Hydro Static Transmission), is adopted. The forward-reverse switching device includes a hydraulic clutch for controlling engagement/disengagement for the power for forward traveling, a hydraulic clutch for controlling engagement/disengagement for the power for reverse traveling, and a solenoid valve for controlling the flow of oil provided in the clutches. Note that, as the continuously-variable transmission, it is also possible to adopt an HMT (Hydraulic Mechanical Transmission), which is an example of a hydro-mechanical continuously-variable transmission, a hydro-static continuously-variable transmission, a belt-type continuously-variable transmission, etc., instead of the I-HMT. Further, it is also possible that the transmission unit 15 includes an electro-hydraulically-controlled multi-step transmission device having multiple hydraulic clutches for transmission and multiple solenoid valves for controlling the flow of oil provided in the clutches, instead of the continuously-variable transmission.

Although not illustrated in the drawings, the brake unit 17 includes left and right brakes for individually braking the left and right rear wheels 11, a foot brake system for operating the left and right brakes in conjunction with stepping operations on the left and right brake pedals provided in the driving section 12, a parking brake system for operating the left and right brakes in conjunction with operations on a parking lever provided in the driving section 12, a turning brake system for operating the brake on the inner side of a turn in conjunction with steering of the left and right front wheels 10 at an angle larger than a set angle, etc.

As illustrated in FIG. 2 through FIG. 3, the on-board control unit 40 includes an engine control unit 41 for control related to the engine 14, a vehicle speed control unit 42 for control related to the vehicle speed of the tractor 1 and switching of the forward-reverse traveling, a steering control unit 43 for control related to steering, a work device control unit 44 for control related to the work device such as the rotary tillage device 6, a display control unit 45 for control related to displaying and notification by the liquid crystal monitor 32 or the like, an automatic travel control unit 46 for control related to automatic traveling, a non-volatile-type on-board storage unit 47 for storing a target path for automatic traveling that is generated according to travel areas segmented in a field, etc. Each of the control units 41 through 46 is configured with an electronic control unit, in which a microcontroller, etc., are integrated, and various kinds of control programs, etc. Each of the control units 41 through 46 is connected via CAN (Controller Area Network) so as to be capable of performing mutual communication. Note that the mutual communication among the control units 41 through 46 is not limited to CAN and can also be performed via another communication standard or next-generation communication standard (for example, CAN-FD (Controller Area Network Flexible Data-Rate) or on-board Ethernet).

The vehicle state detection device 23 is a collective term referring to various kinds of sensors and switches provided in the respective units of the tractor 1. The vehicle state detection device 23 includes an acceleration sensor for detecting the operating position of the acceleration lever, the first position sensor for transmission for detecting the operating position of the main transmission lever 29, the second position sensor for forward-reverse traveling switch for detecting the operating position of the reverser lever for forward-reverse traveling switch, a rotation sensor for detecting the output rotational speed of the engine 14, a vehicle speed sensor for detecting the vehicle speed of the tractor 1, a steering angle sensor for detecting the steering angle of the front wheels 10, etc., in addition to, as illustrated in FIG. 3, a PTO switch 50 for commanding engagement/disengagement for the power transmission to the rotary tillage device 6, a work height setting dial (an example of the work height setting unit and the raising and lowering operation tool) 51 for setting the work height of the rotary tillage device 6, a work depth setting dial (an example of the work height setting unit and the raising and lowering operation tool) 52 for setting the work depth (tillage depth) which is another work height of the rotary tillage device 6, a retraction height setting dial (an example of the raising and lowering operation tool) 53 for setting the retraction height for retracting the rotary tillage device 6 upward, a raising and lowering switch (an example of the raising and lowering instruction unit and the raising and lowering operation tool) 54 for providing an instruction for raising and lowering of the rotary tillage device 6, a height detector 55 for detecting the height position of the rotary tillage device 6, a work depth detector 56 (an example of the height detector) for detecting the work depth of the rotary tillage device 6, a roll angle setting dial 57 for setting the roll angle of the rotary tillage device 6, a tilt sensor 58 for detecting the roll angle of the tractor 1, etc.

As illustrated in FIG. 7, the work height setting dial 51 is provided in the right armrest 31A of the seat 31 together with the main transmission lever 29, etc. The raising and lowering switch 54 is provided in the front part of the main transmission lever 29. Although illustration in the drawings is omitted, the work depth setting dial 52 is provided in the operation panel which is arranged on the right side of the seat 31 together with the PTO switch 50, the retraction height setting dial 53, etc.

The height detector 55 detects the up-down swing angle of the left and right lift arms, which are included in the raising and lowering drive unit 20, as the height position of the rotary tillage device 6. The work depth detector 55 detects the up-down swing angle of the rear cover 6A (see FIG. 1 and FIG. 5), which swings up and down according to the work depth of the rotary tillage device 6, as the work depth of the rotary tillage device 6. Additionally, in a case where the work device connected to the rear part of the tractor 1 is a towed-type work device such as a plow, a cultivator, or a subsoiler, the work depth detector 55 is changed to one that detects the towing load imposed on the three-point link mechanism 5 as the work depth of the work device.

The engine control unit 41 executes the engine rotational speed maintaining control for maintaining the engine rotational speed at a rotational speed according to the operating position of the acceleration lever, based on the detected information from the acceleration sensor and the detected information from the rotation sensor, etc.

The vehicle speed control unit 42 executes the vehicle speed control for controlling operation of the continuously-variable transmission so that the vehicle speed of the tractor 1 is changed to the speed according to the operating position of the main transmission lever 29, based on the detected information from the first position sensor, the detected information from the vehicle speed sensor, etc., forward-reverse traveling switch control for switching the power transmission state of the forward-reverse switching device, based on the detected information from the second position sensor, etc. The vehicle speed control includes a deceleration-and-stop process for controlling the continuously-variable transmission to decelerate into the zero-speed state so as to make the tractor 1 to stop traveling in a case where the main transmission lever 29 is operated so as to be in the zero-speed position.

As illustrated in FIG. 3, the work device control unit 44 includes a clutch control module 44A for controlling the operation of the work clutch unit 19, a raising and lowering control module (an example of the raising and lowering control unit) 44B for controlling the operation of the raising and lowering drive unit 20, a rolling control module 44C for controlling the operation of the rolling drive unit 21, etc.

In a case where the power transmission to the rotary tillage device 6 is instructed by an operation on the PTO switch 50, the clutch control module 44A executes the work power transmission control for controlling the operation of the work clutch unit 19 so that the power is transmitted to the rotary tillage device 6. In a case where cutoff of the power transmission to the rotary tillage device 6 is instructed by an operation on the PTO switch 50, the clutch control module 44A executes the work power cutoff control for controlling the operation of the work clutch unit 19 so that the power transmission to the rotary tillage device 6 is cut off.

In a case where raising or lowering of the rotary tillage device 6 is instructed by an operation on the raising and lowering switch 54, the raising and lowering control module 44B executes the automatic raising and lowering control for controlling the operation of the raising and lowering drive unit 20 to raise or lower the rotary tillage device 6, based on the raising or lowering instruction, so that the height position of the rotary tillage device 6 matches the work height of the rotary tillage device 6 that is set with the work height setting dial 51 (hereinafter referred to as the set work height), the work depth of the rotary tillage device 6 that is set with the work depth setting dial 52 (hereinafter referred to as the set work depth), or the retraction height that is set with the retraction height setting dial 53.

For a detail of the automatic raising and lowering control, in a case where the raising and lowering switch 54 is operated downward so as to send a lowering instruction for the rotary tillage device 6 in a state where the rotary tillage device 6 is positioned at the retraction height, the raising and lowering control module 44B receives the lowering instruction and performs a work height position judgement process for judging whether or not the set work height according to the work height setting dial 51 is the lowest position. Then, in a case where it is judged in the work height position judgement process that the set work height is not the lowest position, the raising and lowering control module 44B sets the control target height of the rotary tillage device 6 in the automatic raising and lowering control to the set work height according to the work height setting dial 51. Thereafter, the operation of the raising and lowering drive unit 20 is controlled so as to start the first lowering process, in which the rotary tillage device 6 is lowered until the height position of the rotary tillage device 6 (the height position of the rotary tillage device 6 detected by the height detector 55) matches the set work height (falls within the switching differential of the set work height), and the first lowering process is terminated in a case where the height position of the rotary tillage device 6 matches the set work height. Further, in a case where it is judged in the work height position judgement process that the set work height is the lowest position, the raising and lowering control module 44B sets the control target height of the rotary tillage device 6 in the automatic raising and lowering control to the set work depth according to the work depth setting dial 52. Thereafter, the operation of the raising and lowering drive unit 20 is controlled so as to start the second lowering process, in which the rotary tillage device 6 is lowered until the height position of the rotary tillage device 6 (the work depth of the rotary tillage device 6 detected by the work depth detector 56) matches the set work depth (falls within the switching differential of the set work depth). Then, the second lowering process is terminated in a case where the work depth of the rotary tillage device 6 matches the set work depth, and the work depth maintaining process for raising or lowering the rotary tillage device 6 so that the state in which the work depth of the rotary tillage device 6 matches the set work depth is maintained is started. In a case where the raising and lowering switch 54 is operated upward so as to send a raising instruction of the rotary tillage device 6 in a state where the rotary tillage device 6 is positioned at the set work height or the set work depth, the raising and lowering control module 44B receives the raising instruction and sets the control target height of the rotary tillage device 6 in the automatic raising and lowering control to the retraction height according to the retraction height setting dial 53. Thereafter, the operation of the raising and lowering drive unit 20 is controlled so as to start the raising process, in which the rotary tillage device 6 is raised until the height position of the rotary tillage device 6 (the height position of the rotary tillage device 6 detected by the height detector 55) matches the above-described retraction height (falls within the switching differential of the retraction height), and the raising process is terminated in a case where the height position of the rotary tillage device 6 matches the retraction height.

The rolling control module 44C executes the roll angle maintaining control, in which the operation of the rolling drive unit 21 is controlled based on the roll angle of the rotary tillage device 6 that is set with the roll angle setting dial 57, the roll angle of the tractor 1 that is detected with the tilt sensor 58, etc., so as to maintain the tilt posture of the rotary tillage device 6 in the roll direction at a predetermined tilt posture (for example, a horizontal posture) which corresponds to the roll angle of the rotary tillage device 6 that is set with the roll angle setting dial 57.

The positioning unit 24 includes a satellite navigation device 25 for measuring the current position and the current direction of the tractor 1 by use of GNSS (Global Navigation Satellite System), which is an example of a satellite positioning system (NNS: Navigation Satellite System), an inertial measurement device (IMU: Inertial Measurement Unit) 26 for measuring the posture, the direction, etc., of the tractor 1 by use of a three-axis gyroscope, a three-direction acceleration sensor, and the like included therein, etc. The positioning methods using GNSS include DGPS (Differential GPS), RTK-GPS (Real Time Kinematic GPS), etc. In the present embodiment, RTK-GPS, which is suitable for positioning of a movable object, is adopted. Therefore, as illustrated in FIG. 1, a reference station 73 that enables positioning by use of RTK-GPS is installed at a given position in the vicinity of the field.

As illustrated in FIG. 1 through FIG. 2, the tractor 1 and the reference station 73 respectively include positioning antennas 75 and 76 for receiving radio waves transmitted from positioning satellites 74 (see FIG. 1), communication modules 77 and 78 for enabling wireless communication of various kinds of information including positioning information between the tractor 1 and the reference station 73, etc. Accordingly, the satellite navigation device 25 of the positioning unit 24 is capable of measuring the current position and the current direction of the tractor 1 with high precision, based on positioning information, which is acquired by the positioning antenna 75 on the tractor side receiving radio waves from the positioning satellites 74, and positioning information, which is acquired by the positioning antenna 76 on the reference station side receiving radio waves from the positioning satellites 74. In addition, since the positioning unit 24 includes the satellite navigation device 25 and the inertial measurement device 26, it is possible to measure the current position, current direction, and attitude angles (yaw angle, roll angle, pitch angle) of the tractor 1 with high precision.

In this tractor 1, the inertial measurement device 26 of the positioning unit 24, the positioning antenna 75, and the communication module 77 are included in the antenna unit 79 illustrated in FIG. 1. The antenna unit 79 is arranged at the center position of the front top part of the cabin 13. The mounted position of the positioning antenna 75 on the tractor 1 is the positioning target position p0 for measuring the current position of the tractor 1 by use of GNSS (see FIG. 4).

As illustrated in FIG. 2 and FIG. 3, the portable communication terminal 3 is provided with a terminal control unit 80, which includes an electronic control unit integrated with a microcontroller or the like, various kinds of control programs, etc., a communication module 90, which enables wireless communication of various kinds of information including positioning information with the communication module 77 on the tractor side, etc. The terminal control unit 80 includes a display control unit 81 for controlling the operation of the display device 4, etc., a target path generation unit 82 for generating a target path P for automatic traveling, a non-volatile-type terminal storage unit 83 for storing a target path P generated by the target path generation unit 82, etc. As various kinds of information to be used for generating a target path P, the terminal storage unit 83 stores vehicle body information such as the turning radius and work width of the tractor 1, field information that is acquired based on the above-described positioning information, etc. As illustrated in FIG. 4, in order to specify the shape, size, etc., of the field A, the field information includes four corner positions Ap1 through Ap4, which are multiple shape specification positions (shape specification coordinates) in the field A that are acquired by use of GNSS when the tractor 1 is made to travel along the outer peripheral edge of the field A, a shape specification line AL in a rectangular shape, which is for specifying the shape, size, etc., of the field A by connecting those corner positions Ap1 through Ap4. etc.

As illustrated in FIG. 4, the target path generation unit 82 generates a target path P, based on the turning radius and work width of the tractor 1 that are included in the vehicle body information, the shape and size of the field A that are included in the field information, etc. Specifically, as illustrated in 0.4, for example, in a case where the start position p1 and end position p2 of automatic traveling are set in the rectangular-shaped field A and the work travel direction of the tractor 1 is set as a direction along the short side of the field A, the target path generation unit 82 firstly segments the field A into a margin area A1 that is adjacent to the outer peripheral edge of the field A and a travel area A2 that is positioned inside the margin area A1, based on the four above-described corner positions Ap1 through Ap4 and shape specification line AL in a rectangular shape. Next, based on the turning radius, work width, etc., of the tractor 1, the target path generation unit 82 generates multiple parallel paths P1 in the travel area A2 that are arranged in the direction along the long side of the field A in parallel at regular intervals according to the work width and also generates multiple turning paths P2 that are arranged at respective outer edge parts of the long side in the travel area A2 so as to connect the multiple parallel paths P1 in the travel order. Then, the travel area A2 is segmented into a pair of non-working areas A2a which are set at the respective outer edge parts on the long side in the travel area A2 and a working area A2b which is set between the pair of non-working areas A2a, and each of the parallel paths P1 is segmented into non-working paths P1a that are included in the pair of non-working areas A2a and a working path P1b that is included in the working area A2b. Accordingly, the target path generation unit 82 can generate a target path P that is suitable for making the tractor 1 automatically travel in the field A illustrated in FIG. 4.

In the field A illustrated in FIG. 4, the margin area A1 is an area that is ensured between the outer peripheral edge and the travel area A2 of the field A in order to prevent the rotary tillage device 6, etc., from making contact with another object such as a ridge that is adjacent to the field A when the tractor 1 automatically travels in the outer peripheral part of the travel area A2. Each of the non-working areas A2a is a ridge-side turning area for the tractor 1 to perform turning movement from the current working path P1b to the next working path P1b by the ridge of the field A.

In the target path P illustrated in FIG. 4, each non-working path P1a and each turning path P2 are paths in which the tractor 1 automatically travel without performing the tillage work, and each working path P1b described above is a path in which the tractor 1 automatically travel while performing the tillage work. The start edge position p3 of each working path P1b is a working start position where the tractor 1 starts the tillage work, and the end edge position p4 of each working path P1b is the working stop position where the tractor 1 stops the tillage work. Each non-working path P1a is a position alignment path for aligning a working stop position p4 for the tractor 1 to pass before performing turning traveling on a turning path P2 and a working start position p3 for the tractor 1 to pass after performing the turning traveling on the turning path P2 in the work travel direction of the tractor 1. Of the respective connection positions p5 and p6 between each parallel path P1 and each turning path P2, the connection positions p5 on the end edge side of the respective parallel paths P1 are turning start positions of the tractor 1 and the connection positions p6 on the start edge side of the respective parallel paths P1 are turning end positions of the tractor 1.

Note that the target path P illustrated in FIG. 4 is merely an example, and it is possible for the target path generation unit 82 to generate various target paths P, based on vehicle body information, which differs according to the model of the tractor 1, the type of work, etc., and field information of the shape, size, etc., of the field A, which differs according to the field A, so that the target paths P suit the vehicle body information and the field information.

The target path P is stored in the terminal storage unit 83 in a state of being associated with the vehicle body information, the field information, etc., and can be displayed on the display device 4 of the portable communication terminal 3. The target path P includes a target vehicle speed of the tractor 1 on each parallel path P3, a target vehicle speed of the tractor 1 on each turning path P2b, a front wheel steering angle on each parallel path P1, a front wheel steering angle on each turning path P2b, etc.

The terminal control unit 80 sends the vehicle body information, field information, target path P, etc., which are stored in the terminal storage unit 83, to the on-board control unit 40 in response to a send-request command from the on-board control unit 40. The on-board control unit 40 stores the received vehicle body information, field information, target path P, etc., in the on-board storage unit 47. Regarding the sending of a target path P, it is also possible for the terminal control unit 80 to send all target paths P at once from the terminal storage unit 83 to the on-board control unit 40 in a stage before the tractor 1 starts automatic traveling, for example. Further, for example, it is also possible for the terminal control unit 80 to divide the target path P into multiple sets of divided path information on a per predetermined distance basis and sequentially send a predetermined number of divided path information from the terminal storage unit 83 to the on-board control unit 40 according to the travel order of the tractor 1 each time the travel distance of the tractor 1 reaches a predetermined distance since a stage before the tractor 1 starts automatic traveling.

To the automatic travel control unit 46 of the on-board control unit 40, detected information from various kinds of sensors, switches, etc., included in the vehicle state detection device 23 is input via the vehicle speed control unit 42, the steering control unit 43, etc. In this way, it is possible for the automatic travel control unit 46 to monitor various kinds of setting states of the tractor 1, operation states of each unit, etc.

In a case where the display device 4 of the portable communication terminal 3 is operated by the user, such as the passenger or the administrator outside of the vehicle, so as to provide an instruction for starting the automatic traveling in a state where the traveling mode of the tractor 1 is switched to the automatic traveling mode, the automatic travel control unit 46 starts the automatic travel control for making the tractor 1 automatically travel according to the target path P while acquiring the current position, the current direction, etc., of the tractor 1 by use of the positioning unit 24.

The automatic travel control performed by the automatic travel control unit 46 includes an engine automatic control process for sending a control command for automatic traveling related to the engine 14 to the engine control unit 41, a transmission automatic control process for sending a control command for automatic traveling related to the vehicle speed of the tractor 1 and switching of forward-reverse traveling to the vehicle speed control unit 42, a steering automatic control process for sending a control command for automatic traveling related to steering to the steering control unit 43, a working automatic control process for sending a control command for automatic traveling related to the work device such as the rotary tillage device 6 to the work device control unit 44, etc.

In the engine automatic control process, the automatic travel control unit 46 sends an engine rotational speed change command as an instruction for changing the engine rotational speed, based on the set rotational speed or the like that is included in the target path P, etc., to the engine control unit 41. The engine control unit 41 executes engine rotational speed changing control for automatically changing the engine rotational speed according to various kinds of control commands related to the engine 14, which are sent from the automatic travel control unit 46, etc.

In the vehicle speed automatic control process, the automatic travel control unit 46 sends a transmission operation command as an instruction for transmission operation of the continuously-variable transmission, based on the target vehicle speed included in the target path P, a forward-reverse switch command as an instruction for forward-reverse switch operation of the forward-reverse switching device, based on the travel direction of the tractor 1 or the like that is included in the target path P, etc., to the vehicle speed control unit 42. The vehicle speed control unit 42 executes automatic vehicle speed control for automatically controlling the operation of the continuously-variable transmission, automatic forward-reverse switching control for automatically controlling the operation of the forward-reverse switching device, etc., in response to various kinds of control commands related to the continuously-variable transmission, the forward-reverse switching device, etc., which are sent from the automatic travel control unit 46. For example, the automatic vehicle speed control includes an automatic deceleration-and-stop process for controlling the continuously-variable transmission to decelerate to the zero-speed state so as to make the tractor 1 to stop traveling in a case where the target vehicle speed included in the target path P is zero speed, etc.

In the steering automatic control process, the automatic travel control unit 46 sends a steering command as an instruction for steering the left and right front wheels 10, based on the front wheel steering angle or the like that is included in the target path P, etc., to the steering control unit 43. The steering control unit 43 executes an automatic steering control for controlling the operation of the power steering unit 16 in order to steer the left and right front wheels 10, an automatic braking turn control for operating the brake unit 17 in order to operate the brake on the inner side of a turn in a case where the left and right front wheels 10 are steered at an angle equal to or larger than a set angle, etc., in response to a steering command that is sent from the automatic travel control unit 46.

In the working automatic control process, the automatic travel control unit 46 sends a working start command as an instruction for switching the rotary tillage device 6 to the working state, based on a working start position p3 included in the target path P, a working stop command as an instruction for switching the rotary tillage device 6 to the non-working state, based on a working stop position p4 included in the target path P, etc., to the work device control unit 44. In a case of receiving the working start command from the automatic travel control unit 46, the work device control unit 44 firstly performs the work height position judgement process of the automatic raising and lowering control by use of the above-described raising and lowering control module 44B. In a case where it is judged in the work height position judgement process that the set work height is not the lowest position, the work device control unit 44 not only starts the first lowering process of the automatic raising and lowering control by use of the above-described raising and lowering control module 44B but also executes the work power transmission control by use of the above-described clutch control module 44A and starts the roll angle maintaining control by use of the rolling control module 44C. Then, in a case where the height position of the rotary tillage device 6 matches the set work height, the first lowering process is terminated. Accordingly, it is possible to start the tillage work in which the rotary tillage device 6 is operated while being maintained at the set work height in a predetermined tilt posture. In a case where it is judged in the work height position judgement process that the set work height is the lowest position, the work device control unit 44 not only starts the second lowering process of the automatic raising and lowering control by use of the above-described raising and lowering control module 44B but also executes the work power transmission control by use of the above-described clutch control module 44A and starts the roll angle maintaining control by use of the rolling control module 44C. Then, in a case where the work depth of the rotary tillage device 6 matches the set work depth, the second lowering process is terminated, and the work depth maintaining process of the automatic raising and lowering control by use of the raising and lowering control module 44B is started. Accordingly, it is possible to start the tillage work in which the rotary tillage device 6 is operated while being maintained at the set work depth and maintained in a predetermined tilt posture. In a case of receiving a working stop command from the automatic travel control unit 46, the work device control unit 44 not only starts the raising process of the automatic raising and lowering control by use of the above-described raising and lowering control module 44B but also executes the work power cutoff control by use of the above-described clutch control module 44A and terminates the roll angle maintaining control by use of the rolling control module 44C. Then, in a case where the height position of the rotary tillage device 6 matches the retraction height, the raising process is terminated. Accordingly, it is possible to stop the tillage work performed by the rotary tillage device 6 and make the rotary tillage device 6 retracted at the retraction height.

That is, the above-described automatic travel unit 2 includes the power steering unit 16, the brake unit 17, the work clutch unit 19, the raising and lowering drive unit 20, the rolling drive unit 21, the vehicle state detection device 23, the positioning unit 24, the on-board control unit 40, the communication module 77, etc. Further, when these operate properly, it is possible to make the tractor 1 automatically travel with high precision according to the target path P and to make the rotary tillage device 6 perform tillage properly.

As illustrated in FIG. 2, the tractor 1 is provided with an obstacle detection unit 100 for detecting the existence or inexistence of obstacles around the tractor 1. Obstacles detected by the obstacle detection unit 100 include people such as workers and other work vehicles working in the travel area A2 of the field A, utility poles and trees existing in the travel area A2 of the field A, etc.

In a case where the obstacle detection unit 100 detects the existence of an obstacle, the automatic travel control unit 46 executes contact avoidance control for avoiding the tractor 1 from making contact with the obstacle. The contact avoidance control includes a notification process for notifying the user of the existence of the obstacle by use of the liquid crystal monitor 32 of the tractor 1, the display device 4 of the portable communication terminal 3, or the like, an automatic deceleration process to automatically reduce the vehicle speed of the tractor 1, and an automatic deceleration-and-stop process for reducing the vehicle speed of the tractor 1, to zero speed so as to stop the tractor 1, etc.

As illustrated in FIG. 1 through FIG. 2 and FIG. 5 through FIG. 6, the obstacle detection unit 100 includes two front and rear LiDAR sensors (Light Detection and Ranging sensors) 101 and 102, which measure the relative position of an obstacle located in front of or behind the tractor 1, and a left and right pair of sonar units 103 and 104, which measure the distance from the tractor 1 to an obstacle located on the left or right of the tractor 1.

As illustrated in FIG. 5 through FIG. 6, each of the LiDAR sensors 101 and 102 uses a laser to three-dimensionally measure the distance to an obstacle and generate a three-dimensional image. Each of the LiDAR sensors 101 and 102 measures the distance to an obstacle in the TOF (time of flight) method, in which the distance to an obstacle is measured based on a round-trip time for a laser light (for example, a pulsed near-infrared laser light) to hit the obstacle and be reflected. Each of the LiDAR sensors 101 and 102 performs scanning with a laser light in the up-down direction and the left-right direction at high speed and sequentially measures the distances to obstacles at respective scanning angles, so as to three-dimensionally measure the distances to the obstacles. Each of the LiDAR sensors 101 and 102 repeatedly measures the distance to an obstacle within each of the measurement range C and D on a real-time basis. Each of the LiDAR sensors 101 and 102 acquires the relative position of an obstacle, based on the linear distance to the obstacle, the irradiation angle to the obstacle, etc., which are included in the measurement result, and generates a three-dimensional image as an output to the on-board control unit 40. The three-dimensional image from each of the LiDAR sensors 101 and 102 can be displayed on the liquid crystal monitor 32 of the tractor 1, the display device 4 of the portable communication terminal 3, etc., so that it is thereby possible to allow the user, etc., to visually recognize the situation on the front side of the tractor 1 and the situation on the rear side of the tractor 1. Note that, in a three-dimensional image, the distance in the perspective direction can be indicated with colors, etc., for example.

As illustrated in FIG. 1 and FIG. 5 through FIG. 6, of the front and rear LiDAR sensors 101 and 102, the front LiDAR sensor 101 is arranged at the center position of the front top part of the cabin 13, on which the above-described antenna unit 79 is arranged, in a front-lowering posture so as to look down the front side of the tractor 1 from diagonally above. Accordingly, the front LiDAR sensor 101 is set so that the front side of the tractor 1 is the measurement range C. The rear LiDAR sensor 102 is arranged at the center position of the rear top part of the cabin 13 in a rear-lowering posture so as to look down the rear side of the tractor 1 from diagonally above. Accordingly, the rear LiDAR sensor 102 is set so that the rear side of the tractor 1 is the measurement range D.

In the measurement ranges C and D of the respective LiDAR sensors 101 and 102, for the areas in which a part of the tractor 1 or a part of the rotary tillage device 6 is present, a masking process for covering those areas is performed, so that the part of the tractor 1 or the part of the rotary tillage device 6 that is present in those areas is not detected as an obstacle by each of the LiDAR sensors 101 and 102.

Note that, regarding the measurement ranges C and D of the respective LiDAR sensors 101 and 102, it is also possible to perform a cut process for limiting those ranges in the left-right direction into set ranges according to the work width of the rotary tillage device 6.

As for the front and rear LiDAR sensors 101 and 102, in a case where the forward-reverse switching device of the transmission unit 15 is switched to the forward traveling state so that the tractor 1 is traveling forward, the front LiDAR sensor 101 becomes a measuring state and the rear LiDAR sensor 102 becomes a measuring-stopped state. Further, in a case where the forward-reverse switching device of the transmission unit 15 is switched to the reverse traveling state so that the tractor 1 is traveling backward, the front LiDAR sensor 101 becomes a measuring-stopped state and the rear LiDAR sensor 102 becomes a measuring state. In a case where multiple obstacles exist in those measurement ranges C and D, the front and rear LiDAR sensors 101 and 102 measure the distances to the obstacles, respectively.

As illustrated in FIG. 1 and FIG. 5 through FIG. 6, each of the sonar units 103 and 104 measures the distance to an obstacle by use of ultrasonic waves. Each of the sonar units 103 and 104 measures the distance to an obstacle in the TOF (time of flight) method, in which the distance to an obstacle is measured based on a round-trip time for emitted ultrasonic waves to hit the obstacle and be reflected. Of the left and right sonar units 103 and 104, the right sonar unit 103 is attached to the right boarding/alighting step 13A, which is arranged at a lower part on the right side of the cabin 13, in such a posture facing downward to the right with a small depression angle. Accordingly, the right sonar unit 103 is arranged at a relatively high position between the right-side front wheel 10 and the right-side rear wheel 11 in such a state where the right outer side of the tractor 1 is set as the measurement range N. The left sonar unit 104 is attached to the left boarding/alighting step 13A, which is arranged at a lower part on the left side of the cabin 13, in such a posture facing downward to the left with a small depression angle. Accordingly, the left sonar unit 104 is arranged at a relatively high position between the left-side front wheel 10 and the left-side rear wheel 11 in such a state where the left outer side of the tractor 1 is set as the measurement range N.

As illustrated in FIG. 1 through FIG. 2 and FIG. 5, the tractor 1 is provided with two front and rear cameras 108 and 109 whose imaging ranges are the front side and the rear side of the tractor 1. As with the front LiDAR sensor 101, the front camera 108 is arranged at the center position of the front top part of the cabin 13 in a front-lowering posture so as to look down the front side of the tractor 1 from diagonally above. As with the rear LiDAR sensor 102, the rear camera 109 is arranged at the center position of the rear top part of the cabin 13 in a rear-lowering posture so as to look down the rear side of the tractor 1 from diagonally above. The captured images of the respective cameras 108 and 109 can be displayed on the liquid crystal monitor 32 of the tractor 1, the display device 4 of the portable communication terminal 3, etc., so that it is thereby possible to allow the user, etc., to visually recognize the situation around the tractor 1.

Figure 8:
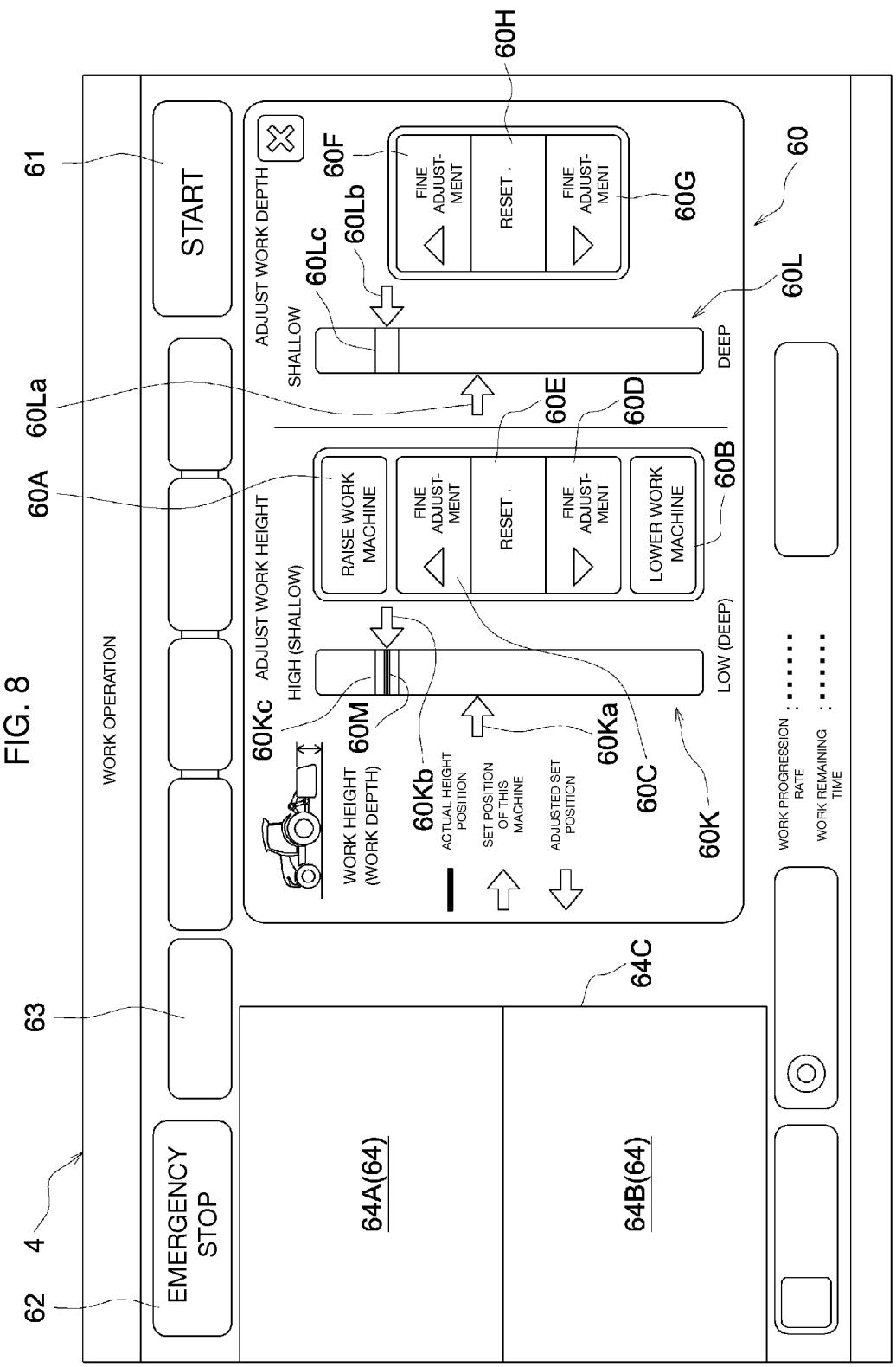
FIG. 8 is a diagram illustrating a raising and lowering operation screen on which an adjustment switch, a work height display section, etc., are displayed.

As illustrated in FIG. 8, the display screen that is displayed on the display device 4 of the portable communication terminal 3 includes a raising and lowering operation screen for enabling a remote operation related to raising and lowering of the rotary tillage device 6 by use of the portable communication terminal 3 in a case where the traveling mode of the tractor 1 is switched to the automatic traveling mode. The raising and lowering operation screen is displayed on the display device 4 in a case where the raising and lowering operation screen is selected by an operation on a display screen selection switch, which is displayed on the display device 4.

As illustrated in FIG. 3 and FIG. 8, on the raising and lowering operation screen, a raising and lowering display area 60 for a display related to raising and lowering of the rotary tillage device 6 in ensured, and, further, a start switch 61 for providing an instruction for starting automatic traveling of the tractor 1, an emergency stop switch 62 for providing an instruction for emergently stop the tractor 1 that is automatically traveling, an engine load factor display section 63 for displaying the load factor on the engine 14, etc., are displayed. In the raising and lowering display area 60, there are displayed a raising switch 60A for providing an instruction for raising the rotary tillage device 6 to the above-described retraction height, a lowering switch 60B for providing an instruction for lowering the rotary tillage device 6 to the set work height or the set work depth, the first adjustment switch (an example of the work height adjustor) 60C for enabling manual adjustment of the set work height in an upward direction, the second adjustment switch (an example of the work height adjustor) 60D for enabling manual adjustment of the set work height in a downward direction, the first reset switch 60E for resetting the adjustment of the set work height that is performed with the first adjustment switch 60C or the second adjustment switch 60D, the third adjustment switch (an example of the work height adjustor) 60F for enabling manual adjustment of the set work depth in an upward direction, the fourth adjustment switch (an example of the work height adjustor) 60G for enabling manual adjustment of the set work depth in a downward direction, the second reset switch 60H for resetting the adjustment of the set work depth that is performed with the third adjustment switch 60F or the fourth adjustment switch 60G, the work height display section 60K for displaying the work height, etc., of the rotary tillage device 6, a work depth display section (an example of the work height display section) 60L for displaying the work depth, which is another work height of the rotary tillage device 6, etc.

In a case where the raising switch 60A is operated in the automatic traveling mode, the terminal control unit 80 sends the above-described raising instruction from the raising switch 60A to the on-board control unit 40. The on-board control unit 40 sends the received raising instruction from the raising switch 60A to the work device control unit 44 via the automatic travel control unit 46. The work device control unit 44 not only performs the raising process of the automatic raising and lowering control by use of the above-described raising and lowering control module 44B, based on the received raising instruction, but also executes the work power cutoff control by use of the above-described clutch control module 44A and terminates the roll angle maintaining control by use of the rolling control module 44C. Then, in a case where the height position of the rotary tillage device 6 matches the retraction height, the raising process is terminated. Accordingly, in a case where the rotary tillage device 6 needs to be raised to the retraction height when the tractor 1 is automatically traveling with the rotary tillage device 6 being in the working state in which the rotary tillage device 6 is positioned at the set work height or the set work depth, it is possible for the user to operate the raising switch 60A on the raising and lowering operation screen, so as to raise the rotary tillage device 6 to the retraction height in an operation-stopped state without stopping the tractor 1 that is automatically traveling.

In a case where the lowering switch 60B is operated in the automatic traveling mode, the terminal control unit 80 sends the above-described lowering instruction from the lowering switch 60B to the on-board control unit 40. The on-board control unit 40 sends the received lowering instruction from the lowering switch 60B to the work device control unit 44 via the automatic travel control unit 46. The work device control unit 44 firstly performs the work height position judgement process of the automatic raising and lowering control by use of the above-described raising and lowering control module 44B, based on the received lowering instruction. Further, in a case where it is judged in the work height position judgement process that the set work height is not the lowest position, not only the first lowering process of the automatic raising and lowering control by use of the above-described raising and lowering control module 44B is started but also the work power transmission control by use of the above-described clutch control module 44A is executed and the roll angle maintaining control by use of the rolling control module 44C is started. Then, in a case where the height position of the rotary tillage device 6 matches the set work height, the first lowering process is terminated. Further, in a case where it is judged in the work height position judgement process that the set work height is the lowest position, not only the second lowering process of the automatic raising and lowering control by use of the above-described raising and lowering control module 44B is started but also the work power transmission control by use of the above-described clutch control module 44A is executed and the roll angle maintaining control by use of the rolling control module 44C is started. Then, in a case where the height position of the rotary tillage device 6 matches the set work depth, the second lowering process is terminated, and the work depth maintaining process of the automatic raising and lowering control by use of the raising and lowering control module 44B is started. Accordingly, in a case of switching the tractor 1 from the working-stopped state to the working state when the tractor 1 is automatically traveling in the working-stopped state in which the rotary tillage device 6 is positioned at the retraction work, it is possible for the user to operate the lowering switch 60B on the raising and lowering operation screen, so as to lower the rotary tillage device 6 to the set work height or the set work depth and make the rotary tillage device 6 operate without stopping the tractor 1 that is automatically traveling.

In a case where the first adjustment switch 60C is operated in the automatic traveling mode, the terminal control unit 80 multiplies the set work height according to the work height setting dial 51 by the correction coefficient corresponding to the operation on the first adjustment switch 60C so as to adjust the set work height in an upward direction, in order to send the adjusted set work height to the on-board control unit 40. The on-board control unit 40 sends the received adjusted set work height to the work device control unit 44 via the automatic travel control unit 46. Upon receiving the adjusted set work height, the work device control unit 44 judges whether or not the height position of the rotary tillage device 6 is the set work height, and, in a case where the height position of the rotary tillage device 6 is the set work height, the control target height in the automatic raising and lowering control is replaced with the adjusted set work height. Then, by performing the automatic raising and lowering control of the raising and lowering control module 44B based on the adjusted set work height, the rotary tillage device 6 is raised to the set work height adjusted with the first adjustment switch 60C. Accordingly, in a case where the tractor 1 is automatically traveling in the working state in which the rotary tillage device 6 is positioned at the unadjusted set work height, when the user feels that it is necessary to finely adjust the work height of the rotary tillage device 6 in an upward direction, it is possible to operate the first adjustment switch 60C, so as to finely adjust the work height of the rotary tillage device 6 in the upward direction without stopping the tractor 1 that is automatically traveling.

In a case where the second adjustment switch 60D is operated in the automatic traveling mode, the terminal control unit 80 multiplies the set work height according to the work height setting dial 51 by the correction coefficient corresponding to the operation on the second adjustment switch 60D so as to adjust the set work height in a downward direction, in order to send the adjusted set work height to the on-board control unit 40. The on-board control unit 40 sends the received adjusted set work height to the work device control unit 44 via the automatic travel control unit 46. Upon receiving the adjusted set work height, the work device control unit 44 judges whether or not the height position of the rotary tillage device 6 is the set work height, and, in a case where the height position of the rotary tillage device 6 is the set work height, the control target height in the automatic raising and lowering control is replaced with the adjusted set work height. Then, by performing the automatic raising and lowering control of the raising and lowering control module 44B based on the adjusted set work height, the rotary tillage device 6 is lowered to the set work height adjusted with the second adjustment switch 60D. Accordingly, in a case where the tractor 1 is automatically traveling in the working state in which the rotary tillage device 6 is positioned at the unadjusted set work height, when the user feels that it is necessary to finely adjust the work height of the rotary tillage device 6 in a downward direction, it is possible to operate the second adjustment switch 60D, so as to finely adjust the work height of the rotary tillage device 6 in the downward direction without stopping the tractor 1 that is automatically traveling.

When the first reset switch 60E is operated in the automatic traveling mode, in a case where the set work height according to the work height setting dial 51 has been adjusted with the first adjustment switch 60C or the second adjustment switch 60D, the terminal control unit 80 resets the adjustment and sends a first reset command to the on-board control unit 40. The on-board control unit 40 sends the received first reset command to the work device control unit 44 via the automatic travel control unit 46. Upon receiving the first reset command, the work device control unit 44 judges whether or not the height position of the rotary tillage device 6 is the adjusted set work height, and, in a case where the height position of the rotary tillage device 6 is the adjusted set work height, the control target height in the automatic raising and lowering control is replaced with the set work height according to the work height setting dial 51 (the unadjusted set work height). Then, by performing the automatic raising and lowering control of the raising and lowering control module 44B based on the unadjusted set work height, the rotary tillage device 6 is raised or lowered to the set work height according to the work height setting dial 51. Accordingly, in a case where the tractor 1 is automatically traveling in the working state in which the rotary tillage device 6 is positioned at the adjusted set work height, when the user feels that it is necessary to return the work height of the rotary tillage device 6 to the set work height according to the work height setting dial 51, it is possible to operate the first reset switch 60E, so as to return the work height of the rotary tillage device 6 to the set work height according to the work height setting dial 51 without stopping the tractor 1 that is automatically traveling.

In a case where the third adjustment switch 60F is operated in the automatic traveling mode, the terminal control unit 80 multiplies the set work depth according to the work depth setting dial 52 by the correction coefficient corresponding to the operation on the third adjustment switch 60F so as to adjust the set work depth in an upward direction, in order to send the adjusted set work depth to the on-board control unit 40. The on-board control unit 40 sends the received adjusted set work depth to the work device control unit 44 via the automatic travel control unit 46. Upon receiving the adjusted set work depth, the work device control unit 44 judges whether or not the height position of the rotary tillage device 6 is the set work depth, and, in a case where the height position of the rotary tillage device 6 is the set work depth, the control target height in the automatic raising and lowering control is replaced with the adjusted set work depth. Then, by performing the automatic raising and lowering control of the raising and lowering control module 44B based on the adjusted set work depth, the rotary tillage device 6 is raised to the set work depth adjusted with the third adjustment switch 60F. Accordingly, in a case where the tractor 1 is automatically traveling in the working state in which the rotary tillage device 6 is positioned at the unadjusted set work depth, when the user feels that it is necessary to finely adjust the work depth of the rotary tillage device 6 in an upward direction, it is possible to operate the third adjustment switch 60F, so as to finely adjust the work depth of the rotary tillage device 6 in the upward direction without stopping the tractor 1 that is automatically traveling.

In a case where the fourth adjustment switch 60G is operated in the automatic traveling mode, the terminal control unit 80 multiplies the set work depth according to the work depth setting dial 52 by the correction coefficient corresponding to the operation on the fourth adjustment switch 60G so as to adjust the set work depth in a downward direction, in order to send the adjusted set work depth to the on-board control unit 40. The on-board control unit 40 sends the received adjusted set work depth to the work device control unit 44 via the automatic travel control unit 46. Upon receiving the adjusted set work depth, the work device control unit 44 judges whether or not the height position of the rotary tillage device 6 is the set work depth, and, in a case where the height position of the rotary tillage device 6 is the set work depth, the control target height in the automatic raising and lowering control is replaced with the adjusted set work depth. Then, by performing the automatic raising and lowering control of the raising and lowering control module 44B based on the adjusted set work depth, the rotary tillage device 6 is lowered to the set work depth adjusted with the fourth adjustment switch 60G. Accordingly, in a case where the tractor 1 is automatically traveling in the working state in which the rotary tillage device 6 is positioned at the unadjusted set work depth, when the user feels that it is necessary to finely adjust the work depth of the rotary tillage device 6 in a downward direction, it is possible to operate the fourth adjustment switch 60G, so as to finely adjust the work depth of the rotary tillage device 6 in the downward direction without stopping the tractor 1 that is automatically traveling.

When the second reset switch 60H is operated in the automatic traveling mode, in a case where the set work depth according to the work depth setting dial 52 has been adjusted with the third adjustment switch 60F or the fourth adjustment switch 60G, the terminal control unit 80 resets the adjustment and sends a second reset command to the on-board control unit 40. The on-board control unit 40 sends the received second reset command to the work device control unit 44 via the automatic travel control unit 46. Upon receiving the second reset command, the work device control unit 44 judges whether or not the height position of the rotary tillage device 6 is the adjusted set work depth, and, in a case where the height position of the rotary tillage device 6 is the adjusted set work depth, the control target height in the automatic raising and lowering control is replaced with the set work depth according to the work depth setting dial 52 (the unadjusted set work depth). Then, by performing the automatic raising and lowering control of the raising and lowering control module 44B based on the unadjusted set work depth, the rotary tillage device 6 is raised or lowered to the set work depth according to the work depth setting dial 52. Accordingly, in a case where the tractor 1 is automatically traveling in the working state in which the rotary tillage device 6 is positioned at the adjusted set work depth, when the user feels that it is necessary to return the work depth of the rotary tillage device 6 to the set work depth according to the work depth setting dial 52, it is possible to operate the second reset switch 60H, so as to return the work depth of the rotary tillage device 6 to the set work depth according to the work depth setting dial 52 without stopping the tractor 1 that is automatically traveling.

As illustrated in FIG. 2 through FIG. 3, the terminal control unit 80 includes an adjustment limiting unit 84 for putting a limitation on manual adjustment of the set work height or set work depth with each of the adjustment switches 60C, 60D, 60F, and 60G, so that, in a case where the set work height or set work depth according to the work height setting dial 51 or the work depth setting dial 52 is manually adjusted with each of the adjustment switches 60C, 60D, 60F, and 60G, the adjusted set work height or set work depth does not exceed the mechanical raising and lowering limit height of the rotary tillage device 6.

As illustrated in FIG. 8, the work height display section 60K displays the set work height according to the work height setting dial 51, the adjusted set work height according to the first adjustment switch 60C or the second adjustment switch 60D, and the height position of the rotary tillage device 6 that is detected by the height detector 55. The work depth display section 60L displays the set work depth according to the work depth setting dial 52, the adjusted set work depth according to the third adjustment switch 60F or the fourth adjustment switch 60G, and the work depth of the rotary tillage device 6 that is detected by the work depth detector 56.

In the work height display section 60K, the set work height is displayed with the arrow 60Ka pointing to the right, and the set work height moves in the up-down direction in response to an operation on the work height setting dial 51. The adjusted set work height is displayed with the arrow 60Kb pointing to the left, and the adjusted set work height moves upward in response to an operation on the first adjustment switch 60C, moves downward in response to an operation on the second adjustment switch 60D, and moves to the set work height according to the work height setting dial 51 in response to an operation on the first reset switch 60E. In the work height display section 60K, the rectangular frame 60Kc displayed so as to be adjacent to the arrow 60Kb pointing to the left indicates the switching differential of the adjusted set work height, and the rectangular frame 60Kc moves in the up-down direction integrally with the arrow 60Kb pointing to the left.

In the work depth display section 60L, the set work depth is displayed with the arrow 60La pointing to the right, and the set work depth moves in the up-down direction in response to an operation on the work depth setting dial 52. The adjusted set work depth is displayed with the arrow 60Lb pointing to the left, and the adjusted set work depth moves upward in response to an operation on the third adjustment switch 60F, moves downward in response to an operation on the fourth adjustment switch 60G, and moves to the set work depth according to the work depth setting dial 52 in response to an operation on the second reset switch 60H. In the work depth display section 60L, the rectangular frame 60Lc displayed so as to be adjacent to the arrow 60Lb pointing to the left indicates the switching differential of the adjusted set work depth, and the rectangular frame 60Lc moves in the up-down direction integrally with the arrow 60Lb pointing to the left.

When the tractor 1 is automatically traveling in a working state in which the rotary tillage device 6 is positioned at the set work depth, that is, during the time in which up-down swing movement of the rear cover 6A (see FIG. 1 and FIG. 5) is detected by the work depth detector 56 in a state where the arrow 60Ka pointing to the right, which indicates the set work height, is positioned at the lowest edge of the work height display section 60K since the set work height is set to the lowest position, the height position of the rotary tillage device 6 is displayed with the horizontal line 60M in the work depth display section 60L and, at other times, is displayed with the horizontal line 60M in the work depth display section 60L. Further, the horizontal line 60M that indicates the height position of the rotary tillage device 6 moves in the up-down direction in the work height display section 60K or the work depth display section 60L in response to raising and lowering of the rotary tillage device 6.

Accordingly, in a case where the user feels that it is necessary to finely adjust the work height of the rotary tillage device 6 when the tractor 1 is automatically traveling in a working state in which the rotary tillage device 6 is positioned at the set work height, it is possible to visually check the work height display section 60K of the raising and lowering operation screen illustrated in FIG. 8, so as to easily figure out each of the set work height according to the work height setting dial 51, which is displayed with the arrow 60Ka pointing to the right, the adjusted set work height according to the first adjustment switch 60C or the second adjustment switch 60D, which is displayed with the arrow 60Kb pointing to the left, and the height position of the rotary tillage device 6, which is detected by the height detector 55 and displayed with the horizontal line 60M. Further, in a case of finely adjusting the height position of the rotary tillage device 6 by operating the first adjustment switch 60C or the second adjustment switch 60D, it is possible to compare the set work height of the rotary tillage device 6, the adjusted set work height, and the height position of the rotary tillage device 6, which are displayed in the work height display section 60K of the raising and lowering operation screen illustrated in FIG. 8, so as to easily figure out the adjustment amount in the set work height according to the first adjustment switch 60C or the second adjustment switch 60D and the change amount in the height position of the rotary tillage device 6 in response to the adjustment amount.

Further, in a case where the user feels that it is necessary to finely adjust the work depth of the rotary tillage device 6 when the tractor 1 is automatically traveling in a working state in which the rotary tillage device 6 is positioned at the set work depth, it is possible to visually check the work depth display section 60L of the raising and lowering operation screen illustrated in FIG. 8, so as to easily figure out each of the set work depth according to the work depth setting dial 52, which is displayed with the arrow 60La pointing to the right, the adjusted set work depth according to the third adjustment switch 60F or the fourth adjustment switch 60G, which is displayed with the arrow 60Lb pointing to the left, and the work depth of the rotary tillage device 6, which is detected by the work depth detector 56 and displayed with the horizontal line 60M. Further, in a case of finely adjusting the work depth of the rotary tillage device 6 by operating the third adjustment switch 60F or the fourth adjustment switch 60G, it is possible to compare the set work depth of the rotary tillage device 6, the adjusted set work depth, and the work depth of the rotary tillage device 6, which are displayed in the work depth display section 60L of the raising and lowering operation screen illustrated in FIG. 8, so as to easily figure out the adjustment amount in the set work depth according to the third adjustment switch 60F or the fourth adjustment switch 60G and the change amount in the work depth of the rotary tillage device 6 in response to the adjustment amount.

As a result, it is possible to easily and properly adjust the work height or the work depth of the rotary tillage device 6 by a remote operation directed to the tractor 1 that is automatically traveling by use of the portable communication terminal 3.

In a case where the automatic traveling of the tractor 1 in the automatic traveling mode is temporarily stopped based on an operation on a temporary stop switch that is displayed on the raising and lowering operation screen, the raising and lowering control module 44B of the work device control unit 44 maintains a state in which manual adjustment of the set work height or the set work depth with each of the adjustment switches 60C, 60D, 60F, and 60G is enabled. Accordingly, during such a temporary stopped state of the tractor 1 as described above, in a case where the automatic traveling of the tractor 1 in the automatic traveling mode is restarted by an operation on a start switch 61 that is displayed on the raising and lowering operation screen illustrated in FIG. 8, it is possible to easily make the rotary tillage device 6 positioned at the same set work height or set work depth as when the tractor 1 was automatically traveling in the automatic traveling mode before temporarily stopped, so that the rotary tillage device 6 performs the tillage work in the same state as before temporarily stopped.

In a case where the automatic traveling mode for making the tractor 1 automatically travel is terminated by an operation on an emergency stop switch 62 that is displayed on the raising and lowering operation screen illustrated in FIG. 8 or by execution of the contact avoidance control based on detection of an obstacle with the obstacle detection unit 100, the raising and lowering control module 44B of the work device control unit 44 disables the manual adjustment of the set work height or set work depth with each of the adjustment switches 60C, 60D, 60F, and 60G and prohibits execution of the automatic raising and lowering control along with the termination of the automatic traveling mode.

Accordingly, it is possible to avoid the set work height or set work depth acquired in response to an operation on the work height setting dial 51 or the work depth setting dial 52 from differing before and after adjustment of the set work height or set work depth with each of the adjustment switches 60C, 60D, 60F, and 60G, which is caused if the manual adjustment of the set work height or set work depth with each of the adjustment switches 60C, 60D, 60F, and 60G is enabled even in the manual traveling mode after the automatic traveling mode is terminated.

Further, even though the set work height or set work depth is returned to the work height or work depth corresponding to the operation on the work height setting dial 51 or the work depth setting dial 52 (the work height or work depth before the adjustment) since the manual adjustment of the set work height or set work depth with each of the adjustment switches 60C, 60D, 60F, and 60G becomes disabled along with the termination of the automatic traveling mode, the execution of the automatic raising and lowering control is prohibited after the automatic traveling mode is terminated, and therefore it is possible to avoid a possibility that the rotary tillage device 6 is unexpectedly raised or lowered from the height position corresponding to the adjusted set work height or set work depth to a height position corresponding to the unadjusted set work height or set work depth, which is caused if the automatic raising and lowering control is executed after the automatic traveling mode is terminated.

When any of the raising and lowering operation tools provided in the tractor 1, such as the raising and lowering switch 54 or the work height setting dial 51 illustrated in FIG. 3, is operated during the time in which execution of the above-described automatic raising and lowering control is prohibited, the raising and lowering control module 44B of the work device control unit 44 cancels the prohibition on execution of the automatic raising and lowering control.

Accordingly, since the prohibition on execution of the automatic raising and lowering control, of which execution is prohibited along with termination of the automatic traveling mode, is cancelled when the user boards the tractor 1 of which the automatic traveling mode has been terminated and operates a raising and lowering operation tool such as the raising and lowering switch 54 or the work height setting dial 51 provided in the tractor 1, the raising and lowering operation of the rotary tillage device 6 by operating a raising and lowering operation tool such as the raising and lowering switch 54 or the work height setting dial 51 is possible when the user makes the tractor 1 travel in the manual traveling mode, so that the rotary tillage device 6 can be positioned at the set work height according to the work height setting dial 51 or at the set work depth according to the work depth setting dial 52, etc.

Further, when the user operates a raising and lowering operation tool such as the raising and lowering switch 54 or the work height setting dial 51, since the user expects raising or lowering of the rotary tillage device 6 based on the operation, even in a case where the prohibition on execution of the automatic raising and lowering control is cancelled because of an operation on any of the raising and lowering operation tools and then the rotary tillage device 6 is raised or lowered from the height position corresponding to the adjusted set work height or set work depth to the height position corresponding to the unadjusted set work height or set work depth, etc., it is possible to avoid the raising or lowering of the rotary tillage device 6 at this moment from being an unexpectable situation for the user.

As a result, while avoiding the possibility that the rotary tillage device 6 is unexpectedly raised or lowered by the automatic raising and lowering control after the automatic traveling mode is terminated, it is possible to raise or lower the rotary tillage device 6 to the set work height according to the work height setting dial 51 or the set work depth according to the work depth setting dial 52, etc., by the automatic raising and lowering control based on an operation on the raising and lowering switch 54, etc., when the user makes the tractor 1 travel in the manual traveling mode.

As illustrated in FIG. 2 through FIG. 3, the terminal control unit 80 includes a communication state judgement unit 85 for judging a communication state of the on-board control unit 40 via the communication modules 77 and 90 and an adjustment disabling unit 86 for disabling manual adjustment of the set work height or set work depth with each of the adjustment switches 60C, 60D, 60F, and 60G after the judgement in a case where the it is judged by the communication state judgement unit 85 that an abnormality has been occurring to the communication state.

Accordingly, when the user operates any of the adjustment switches 60C, 60D, 60F, and 60G of the portable communication terminal 3 for adjusting the set work height or set work depth for the tractor 1 that is automatically traveling, since the manual adjustment of the set work height or set work depth with the adjustment switches 60C, 60D, 60F, and 60G is not disabled by the adjustment disabling unit 86 in a case where an abnormality has not been occurring to the communication state between the terminal control unit 80 and the on-board control unit 40, the adjustment of the set work height or set work depth in response to the operation on the adjustment switches 60C, 60D, 60F, and 60G can be performed with preferable responsiveness. Accordingly, when the tractor 1 is automatically traveling in a state where the rotary tillage device 6 is positioned at the set work height or the set work depth, the rotary tillage device 6 can be raised or lowered to the height position according to the adjusted set work height or set work depth with preferable responsiveness by the automatic raising and lowering control based on the set work height or set work depth adjusted with each of the adjustment switches 60C, 60D, 60F, and 60G.

On the other hand, when the user operates any of the adjustment switches 60C, 60D, 60F, and 60G of the portable communication terminal 3 for adjusting the set work height or set work depth for the tractor 1 that is automatically traveling, since the manual adjustment of the set work height or set work depth with the adjustment switches 60C, 60D, 60F, and 60G is disabled by the adjustment disabling unit 86 in a case where an abnormality has been occurring to the communication state between the terminal control unit 80 and the on-board control unit 40, it is possible to avoid a possibility that, when the abnormality of the communication state is resolved, an adjusted set work height or set work depth that is greatly different from the unadjusted set work height or set work depth is sent to the terminal control unit 80 and the on-board control unit 40 and then the height position of the rotary tillage device 6 is drastically changed by the automatic raising and lowering control based on the adjusted set work height or set work depth that is greatly different, which is caused if the manual adjustment of the set work height or set work depth with each of the adjustment switches 60C, 60D, 60F, and 60G is enabled even during the time in which an abnormality has been occurring to the communication state.

As a result, while making it possible to preferably perform the adjustment of the work height or work depth of the rotary tillage device 6 with preferable responsiveness by a remote operation directed to the tractor 1 that is automatically traveling by use of the portable communication terminal 3 when an abnormality is not occurring to the communication state between the terminal control unit 80 and the on-board control unit 40, it is possible to avoid a possibility that inconvenience such as a malfunction of the rotary tillage device 6 occurs when an abnormality occurs to the communication state between the terminal control unit 80 and the on-board control unit 40 and then the abnormality is resolved, which is caused if the height position of the rotary tillage device 6 is drastically changed.

As illustrated in FIG. 6, as for the obstacle detection unit 100, the measurement ranges C and D of the respective LiDAR sensors 101 and 102 are segmented into deceleration-control areas C1 and D1, which are set as areas that are distant from the respective LiDAR sensors 101 and 102 in the front-rear direction so as to have a left-right width that is wider than the work width of the rotary tillage device 6, stop-control areas C2 and D2, which are set as areas that are closer to the respective LiDAR sensors 101 and 102 compared to the deceleration-control areas C1 and D1, and left and right non-deceleration-control areas C3 and D3, which are out of these areas C1, C2, D1, and D2 in the left and right direction.

If the area in which an obstacle is detected by the obstacle detection unit 100 is the deceleration-control area C1 or D1, the automatic travel control unit 46 not only performs the automatic deceleration process of the above-described contact avoidance control, so as to reduce the vehicle speed of the tractor 1, but also performs a notification process of the above-described contact avoidance control, so as to notify the user by use of the liquid crystal monitor 32 of the tractor 1, the display device 4 of the portable communication terminal 3, etc., that an obstacle exists in the deceleration-control area C1 or D1 and the deceleration operation of the tractor 1 is to be performed. If the area in which an obstacle is detected by the obstacle detection unit 100 is the stop-control area C2 or D2, the automatic travel control unit 46 not only performs the automatic deceleration-and-stop process of the above-described contact avoidance control, so as to stop the tractor 1, but also performs a notification process of the above-described contact avoidance control, so as to notify the user by use of the liquid crystal monitor 32 of the tractor 1, the display device 4 of the portable communication terminal 3, etc., that an obstacle exists in the stop-control area C2 or D2 and the deceleration-and-stop operation of the tractor 1 is to be performed. If the area in which an obstacle is detected by the obstacle detection unit 100 is the non-deceleration-control area C3 or D3, the automatic travel control unit 46 performs a notification process of the above-described contact avoidance control, so as to notify the user by use of the liquid crystal monitor 32 of the tractor 1, the display device 4 of the portable communication terminal 3, etc., that an obstacle exists in the non-deceleration-control area C3 or D3 but the deceleration operation and the deceleration-and-stop operation of the tractor 1 are not to be performed.

Figure 9:
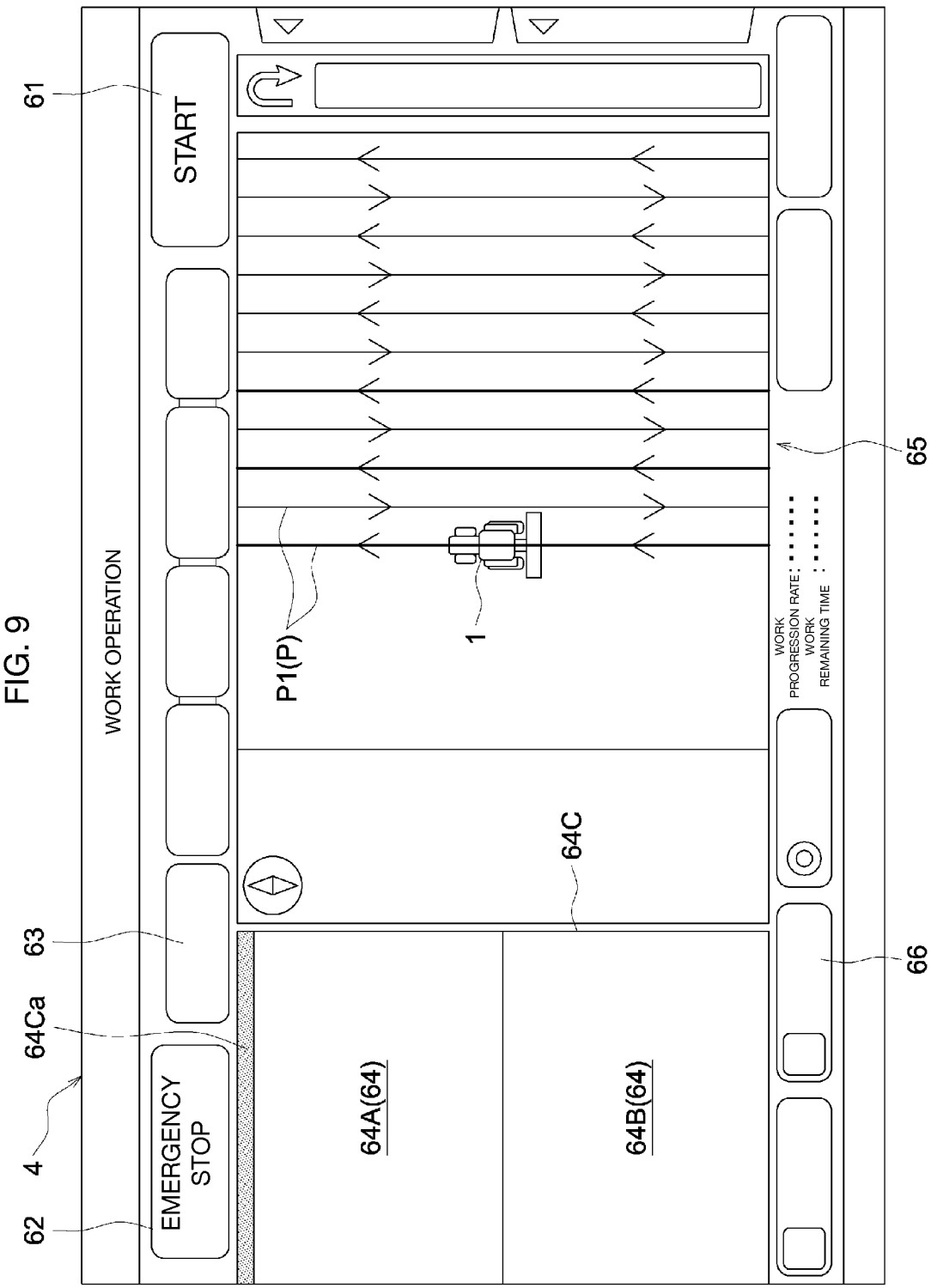
FIG. 9 is a diagram illustrating an automatic travel monitoring screen that is capable of providing a notification of the existence or inexistence of an obstacle, etc.

As illustrated in FIG. 9, the display screen that is displayed on the display device 4 of the portable communication terminal 3 includes an automatic travel monitoring screen for making it easier to monitor the tractor 1 that is automatically traveling in the automatic traveling mode from the outside of the vehicle in a case where the traveling mode of the tractor 1 is switched to the automatic traveling mode. The automatic travel monitoring screen is displayed on the display device 4 in a case where the automatic travel monitoring screen is selected by an operation on a display screen selection switch, which is displayed on the display device 4.

As illustrated in FIG. 9, on the automatic travel monitoring screen, not only a traveling state display area 65 for figuring out the traveling state of the tractor 1 with respect to the target path P is ensured, but also an obstacle information display section 66 for displaying information of obstacles detected by the obstacle detection unit 100, etc., is displayed in addition to the start switch 61, the emergency stop switch 62, the engine load factor display section 63, the image display section 64 for displaying captured images of the respective cameras 108 and 109, etc., which are displayed in the same manner as on the raising and lowering operation screen. The image display section 64 is vertically segmented into a front image display area 64A for displaying a captured image of the front camera 108 and a rear image display area 64B for displaying a captured image of the rear camera 109.

As for the obstacle information display section 66, the display color of the obstacle information display section 66 is changed, based on the notification process of the above-described contact avoidance control, which is performed by the automatic travel control unit 46 of the on-board control unit 40. If the area in which an obstacle is detected by the obstacle detection unit 100 is the deceleration-control area C1 or D1, the automatic travel control unit 46 selects yellow as the display color of the obstacle information display section 66 in the notification process of the above-described contact avoidance control and sends a yellow-display command to the terminal control unit 80 of the portable communication terminal 3. The terminal control unit 80 turns the display color of the obstacle information display section 66 to yellow, based on the yellow-display command, so as to notify the user that an obstacle exists in the deceleration-control area C1 or D1 and the deceleration operation of the tractor 1 is to be performed. If the area in which an obstacle is detected by the obstacle detection unit 100 is the stop-control area C2 or D2, the automatic travel control unit 46 selects red as the display color of the obstacle information display section 66 in the notification process of the above-described contact avoidance control and sends a red-display command to the terminal control unit 80 of the portable communication terminal 3. The terminal control unit 80 turns the display color of the obstacle information display section 66 to red, based on the red-display command, so as to notify the user that an obstacle exists in the stop-control area C2 or D2 and the deceleration-and-stop operation of the tractor 1 is to be performed. If the area in which an obstacle is detected by the obstacle detection unit 100 is the non-deceleration-control area C3 or D3, the automatic travel control unit 46 selects green (normal color) as the display color of the obstacle information display section 66 in the notification process of the above-described contact avoidance control and sends a green-display command to the terminal control unit 80 of the portable communication terminal 3. The terminal control unit 80 turns the display color of the obstacle information display section 66 to green, based on the green-display command, so as to notify the user that obstacles do not exist in the deceleration-control areas C1 and D1 and the stop-control areas C2 and D2 so neither the deceleration operation nor the deceleration-and-stop operation of the tractor 1 is to be performed. Accordingly, it is possible for the user to easily figure out the existence or inexistence of obstacles around the tractor 1 as well as transition of traveling states of the tractor 1 based on detection of obstacles from the outside of the vehicle by monitoring the obstacle information display section 66 without performing special operations on the portable communication terminal 3.

Figure 10:
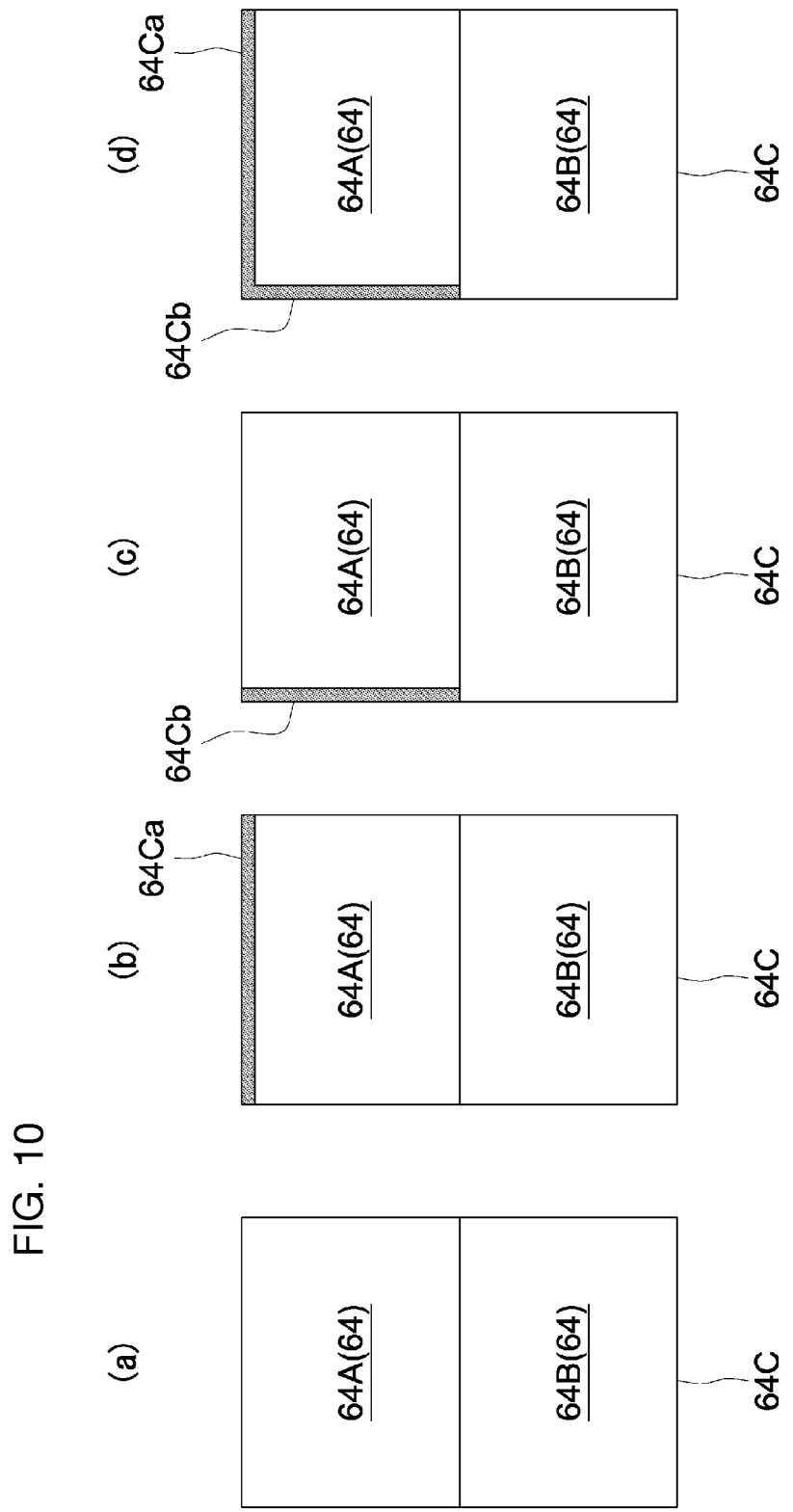
FIG. 10 is a diagram illustrating obstacle notification formats by use of an image display section of the automatic travel monitoring screen.

As illustrated in FIG. 9 through FIG. 10, the display of the image display section 64 on the automatic travel monitoring screen is set so that the segmentation frame 64C that segments the image display section 64 into the front image display area 64A and the rear image display area 64B functions as an obstacle information display section. The display state of the segmentation frame 64C is changed from the normal display state illustrated in FIG. 10 (*a*) to the display states described below, etc., based on the notification process of the above-described contact avoidance control that is performed by the automatic travel control unit 46 of the on-board control unit 40. For example, if the area in which an obstacle is detected by the obstacle detection unit 100 is the front deceleration-control area C1 or stop-control area C2, the automatic travel control unit 46 sends an upper-side part red display command, which is an instruction for changing the display of the upper-side part 64Ca of the segmentation frame 64C to red, to the terminal control unit 80 of the portable communication terminal 3 in the notification process of the above-described contact avoidance control. Based on the upper-side part red display command, the terminal control unit 80 changes the display color of the upper-side part 64Ca of the segmentation frame 64C to red as illustrated in FIG. 10 (*b*), so as to notify the user that an obstacle exists in the front deceleration-control area C1 or stop-control area C2. For example, if the area in which an obstacle is detected by the obstacle detection unit 100 is the front left non-deceleration-control area C3, the automatic travel control unit 46 sends a left-side part red display command, which is an instruction for changing the display of the left-side part 64Cb of the segmentation frame 64C to red, to the terminal control unit 80 of the portable communication terminal 3 in the notification process of the above-described contact avoidance control. Based on the left-side part red display command, the terminal control unit 80 changes the display color of the left-side part 64Cb of the segmentation frame 64C to red as illustrated in FIG. 10 (*c*), so as to notify the user that an obstacle exists in the front left non-deceleration-control area C3. For example, if the areas in which an obstacle is detected by the obstacle detection unit 100 are the front deceleration-control area C1 or stop-control area C2 and the front left non-deceleration-control area C3, the automatic travel control unit 46 sends an upper-side/left-side part red display command, which is an instruction for changing the display of the upper-side part 64Ca and the left-side part 64Cb of the segmentation frame 64C to red, to the terminal control unit 80 of the portable communication terminal 3 in the notification process of the above-described contact avoidance control. Based on the upper-side/left-side part red display command, the terminal control unit 80 changes the display color of the upper-side part 64Ca and the left-side part 64Cb of the segmentation frame 64C to red as illustrated in FIG. 10 (*d*), so as to notify the user that obstacles exist in the front deceleration-control area C1 or stop-control area C2 and the front left non-deceleration-control area C3. In this way, in a case where the obstacle detection unit 100 of the tractor 1 detects an obstacle, the detection information is sent to the terminal control unit 80 of the portable communication terminal 3, and, based on the detection information, the terminal control unit 80 displays the position of the obstacle relative to the tractor 1 by use of the segmentation frame 64C of the image display section 64 on the automatic travel monitoring screen, and therefore it is possible for the user to easily figure out the existence or inexistence of an obstacle around the tractor 1 and the position of an obstacle relative to the tractor 1 from the outside of the vehicle by monitoring the segmentation frame 64C of the image display section 64 without performing special operations to the portable communication terminal 3.

Note that, regarding the notification process of the contact avoidance control, it is also possible to provide a notification of the existence or inexistence of an obstacle around the tractor 1, the position of an obstacle relative to the tractor 1, transition of traveling modes of the tractor 1 based on detection of an obstacle, etc., with letters or audio by use of a letter display function, audio generation function, etc., that is provided in the liquid crystal monitor 32 of the tractor 1, the display device 4 of the portable communication terminal 3, etc.

Other Embodiments

Explanations will be given of other embodiments of the present invention. Note that the configuration of each of the other embodiments explained below can not only be applied independently but also be applied in combination with the configuration of another embodiment.

(1) Other typical embodiments regarding the configuration of the work vehicle 1 are as follows. For example, it is also possible that the work vehicle 1 is configured as a semi-crawler model provided with left and right crawlers instead of the left and right rear wheels 11. For example, it is also possible that the work vehicle 1 is configured as a full-crawler model provided with left and right crawlers instead of the left and right front wheels 10 and the left and right rear wheels 11. For example, it is also possible that the work vehicle 1 is configured as an electric model provided with an electric motor instead of the engine 14. For example, it is also possible that the work vehicle 1 is configured as a hybrid model provided with the engine 14 and an electric motor.

(2) It is also possible that the raising and lowering control unit 44B is configured to prohibit execution of the automatic raising and lowering control along with termination of the automatic traveling mode and to cancel the prohibition on execution of the automatic raising and lowering control when the work height setting unit 51 or 52 of the work vehicle 1 is operated while execution of the automatic raising and lowering control is prohibited and the set work height changed in this operation matches the set work height that had been adjusted with the work height adjustors 60C, 60D, 60F, and 60G at the timing of termination of the automatic raising and lowering control.

(3) It is also possible that the remote operation device 3 is configured so as to have a roll angle adjustor that enables manual adjustment of the roll angle of the work device 6 by a remote operation, in addition to the work height adjustors 60C, 60D, 60F, and 60G that enable manual adjustment of the work height (including the work depth) of the work device 6 by a remote operation. Further, it is also possible that the display device 4 is configured so as to have a roll angle display section that displays the roll angle of the work device 6 that is set with the roll angle setting dial 57, the roll angle adjusted with the roll angle adjustor, and the roll angle of the work vehicle 1 that is detected by the tilt sensor 58.

(4) It is also possible that the multiple raising and lowering operation tools include a raising and lowering lever to be used when controlling the position of the work device, etc.

INDUSTRIAL APPLICABILITY

The automatic travel system for a work vehicle, according to the present invention, can be applied to a work vehicle such as a tractor, riding-type mower, a riding-type rice transplanter, a combine, a wheel loader, or a snowplow.

DESCRIPTION OF REFERENCE NUMERALS

1 tractor (work vehicle)
2 automatic travel unit
3 portable communication terminal (remote operation device)
4 display device
6 rotary tillage device (work device)
44B raising and lowering control module (raising and lowering control unit)
51 work height setting dial (work height setting unit, raising and lowering operation tool)
52 work depth setting dial (work height setting unit, raising and lowering operation tool)
53 retraction height setting dial (raising and lowering operation tool)
54 raising and lowering switch (raising and lowering instruction unit, raising and lowering operation tool)
55 height detector
56 work depth detector (height detector)
60C first adjustment switch (work height adjustor)
60D second adjustment switch (work height adjustor)
60F third adjustment switch (work height adjustor)
60G fourth adjustment switch (work height adjustor)
60K work height display section
60L work depth display section (work height display section)
85 communication state judgement unit
86 adjustment disabling unit

The invention claimed is:

1. An automatic travel system for a work vehicle, comprising an automatic travel unit for enabling automatic traveling of a work vehicle and a remote operation device for enabling a remote operation on the work vehicle via wireless communication, wherein the work vehicle includes a work device that can be raised and lowered, a work height setting unit for setting a work height of the work device, a height detector for detecting a height position of the work device, a raising and lowering instruction unit for providing an instruction for raising and lowering of the work device, and a raising and lowering control unit for controlling raising and lowering of the work device, wherein the raising and lowering control unit executes automatic raising and lowering control for setting a control target height of the work device as the work height, based on the instruction from the raising and lowering instruction unit, and matching the height position of the work device with the work height, wherein the remote operation device includes a display device for displaying information related to the remote operation of the work vehicle and a work height adjustor for enabling manual adjustment of the work height in an automatic traveling mode of the work vehicle, and wherein the display device includes a work height display section for displaying the work height that is set with the work height setting unit, the work height that has been adjusted by the work height adjustor, and the height position of the work device that is detected by the height detector.

2. The automatic travel system for a work vehicle, according to claim 1, wherein, along with termination of the automatic traveling mode, the raising and lowering control unit disables the manual adjustment of the work height with the work height adjustor and prohibits execution of the automatic raising and lowering control.

3. The work vehicle automatic travel system for a work vehicle, according to claim 2, wherein the work vehicle includes a plurality of raising and lowering operation tools related to raising and lowering of the work device, the plurality of raising and lowering operation tools including the work height setting unit and the raising and lowering instruction unit, and wherein the raising and lowering control unit cancels the prohibition on execution of the automatic raising and lowering control when any of the raising and lowering operation tools is operated during a time of the prohibition on execution of the automatic raising and lowering control.

4. The automatic travel system for a work vehicle, according to claim 1, wherein the remote operation device includes a communication state judgement unit for judging a communication state with the work vehicle and an adjustment disabling unit for disabling the manual adjustment of the work height with the work height adjustor after a judgement made by the communication state judgement unit in a case where the judgement indicates that an abnormality has been occurring to the communication state.

* * * * *